US008959350B2

(12) United States Patent
Fielder

(10) Patent No.: US 8,959,350 B2
(45) Date of Patent: Feb. 17, 2015

(54) TOKEN FOR SECURING COMMUNICATION

(75) Inventor: Guy Fielder, Austin, TX (US)

(73) Assignee: PACid Technologies, LLC, Austin, TX (US)

( * ) Notice: Subject to any disclaimer, the term of this patent is extended or adjusted under 35 U.S.C. 154(b) by 600 days.

(21) Appl. No.: 13/203,388

(22) PCT Filed: Mar. 25, 2010

(86) PCT No.: PCT/US2010/028566
§ 371 (c)(1),
(2), (4) Date: Aug. 25, 2011

(87) PCT Pub. No.: WO2010/111440
PCT Pub. Date: Sep. 30, 2010

(65) Prior Publication Data
US 2011/0307699 A1    Dec. 15, 2011

Related U.S. Application Data

(60) Provisional application No. 61/163,416, filed on Mar. 25, 2009.

(51) Int. Cl.
*H04L 9/32* (2006.01)
*H04L 29/06* (2006.01)
*G06F 21/00* (2013.01)

(52) U.S. Cl.
CPC ............ *H04L 63/123* (2013.01); *H04L 9/3226* (2013.01); *H04L 63/126* (2013.01); *H04L 9/3228* (2013.01)
USPC ............................ 713/172; 713/182; 713/185

(58) Field of Classification Search
CPC ... H04L 9/3213; H04L 9/3228; H04L 9/3234; H04L 9/328; H04L 9/3244; H04L 9/32341; H04L 63/08; H04L 63/083; H04L 63/0838; H04L 63/0846; H04L 63/0876; H04L 63/12; H04L 63/123; H04L 63/126
USPC ................ 726/9, 20; 713/170, 172, 181, 182, 713/184–186
See application file for complete search history.

(56) References Cited

U.S. PATENT DOCUMENTS

| 4,613,901 A | 9/1986 | Gilhousen et al. |
| 4,649,233 A | 3/1987 | Bass et al. |

(Continued)

FOREIGN PATENT DOCUMENTS

| EP | 1304848 A2 | 4/2003 |
| EP | 1478156 A2 | 11/2004 |

(Continued)

OTHER PUBLICATIONS

International Search Report and the Written Opinion issued in PCT/US2010/028583; Dated: Jul. 6, 2010; (14 pages).

(Continued)

*Primary Examiner* — Ashok Patel
*Assistant Examiner* — Daniel Potratz
(74) *Attorney, Agent, or Firm* — Osha • Liang LLP

(57) ABSTRACT

In general, the invention relates to a method for performing a command on a token. The method includes receiving a first command authentication message digest (CAMD), a command, and scrambled data from a sender, and making a first determination that the sender is allowed to send commands to the token. The method further includes, based on the first determination, generating a second CAMD on the token using the command, the scrambled data, and an Administrative Command Authentication Secret (ACAS), making a second determination that the first CAMD and the second CAMD match, and based on the second determination, performing the command by the token.

35 Claims, 13 Drawing Sheets

(56) References Cited

U.S. PATENT DOCUMENTS

| | | | |
|---|---|---|---|
| 4,720,860 A | 1/1988 | Weiss | |
| 4,864,615 A | 9/1989 | Bennett et al. | |
| 4,924,515 A | 5/1990 | Matyas et al. | |
| 4,937,866 A | 6/1990 | Crowther et al. | |
| 5,020,105 A | 5/1991 | Rosen et al. | |
| 5,060,263 A | 10/1991 | Bosen et al. | |
| 5,065,429 A | 11/1991 | Lang | |
| 5,068,894 A | 11/1991 | Hoppe | |
| 5,153,919 A | 10/1992 | Reeds, III et al. | |
| 5,233,655 A | 8/1993 | Shapiro | |
| 5,237,610 A | 8/1993 | Gammie et al. | |
| 5,241,598 A | 8/1993 | Raith | |
| 5,309,516 A | 5/1994 | Takaragi et al. | |
| 5,355,413 A | 10/1994 | Ohno | |
| 5,361,062 A | 11/1994 | Weiss et al. | |
| 5,367,572 A | 11/1994 | Weiss | |
| 5,475,758 A | 12/1995 | Kikuchi | |
| 5,475,826 A | 12/1995 | Fischer | |
| 5,481,611 A | 1/1996 | Owens et al. | |
| 5,495,533 A | 2/1996 | Linehan et al. | |
| 5,638,448 A | 6/1997 | Nguyen | |
| 5,757,924 A | 5/1998 | Friedman et al. | |
| 5,796,830 A | 8/1998 | Johnson et al. | |
| 5,953,420 A | 9/1999 | Matyas, Jr. et al. | |
| 5,963,646 A | 10/1999 | Fielder et al. | |
| 5,963,696 A | 10/1999 | Yoshida et al. | |
| 5,966,441 A | 10/1999 | Calamera | |
| 5,974,550 A | 10/1999 | Maliszewski | |
| 5,995,624 A * | 11/1999 | Fielder et al. | 713/169 |
| 6,049,612 A | 4/2000 | Fielder et al. | |
| 6,105,133 A * | 8/2000 | Fielder et al. | 713/169 |
| 6,345,101 B1 | 2/2002 | Shukla | |
| 6,490,353 B1 | 12/2002 | Tan | |
| 6,587,563 B1 | 7/2003 | Crandall | |
| 6,769,060 B1 | 7/2004 | Dent et al. | |
| 6,947,556 B1 | 9/2005 | Matyas, Jr. et al. | |
| 6,987,853 B2 | 1/2006 | Uner | |
| 7,032,240 B1 | 4/2006 | Cronce et al. | |
| 7,095,855 B1 | 8/2006 | Collins | |
| 7,178,025 B2 * | 2/2007 | Scheidt et al. | 713/168 |
| 2002/0143872 A1 | 10/2002 | Weiss et al. | |
| 2002/0191796 A1 | 12/2002 | Muschenborn | |
| 2004/0025028 A1 | 2/2004 | Takeuchi | |
| 2004/0179684 A1 | 9/2004 | Appenzeller et al. | |
| 2004/0230800 A1 | 11/2004 | Futa et al. | |
| 2005/0039030 A1 | 2/2005 | Rodgers et al. | |
| 2005/0063352 A1 | 3/2005 | Amara et al. | |
| 2005/0076061 A1 | 4/2005 | Cox | |
| 2006/0112418 A1 | 5/2006 | Bantz et al. | |
| 2006/0174349 A1 | 8/2006 | Cronce et al. | |
| 2007/0255941 A1 | 11/2007 | Ellis | |
| 2007/0258584 A1 | 11/2007 | Brown et al. | |
| 2008/0065880 A1 | 3/2008 | Martin | |
| 2008/0270791 A1 * | 10/2008 | Nystrom et al. | 713/159 |
| 2010/0070778 A1 | 3/2010 | Murray | |

FOREIGN PATENT DOCUMENTS

| | | | |
|---|---|---|---|
| EP | 1906587 A2 | 4/2008 | |
| GB | 2421407 A | 6/2006 | |
| WO | 9847258 A2 | 10/1998 | |
| WO | 03077469 A1 | 9/2003 | |
| WO | 2004092864 A2 | 10/2004 | |
| WO | 2007005909 A2 | 1/2007 | |
| WO | 2008061848 A2 | 5/2008 | |
| WO | WO 2009074956 A1 * | 6/2009 | G06F 21/00 |

OTHER PUBLICATIONS

International Search Report and the Written Opinion issued in PCT/US2010/028582; Dated: Jul. 30, 2010; (14 pages).
Schneider, B., "Security Pitfalls in Cryptography", Counterpane Systems, www.counterpane.com/publish.html, 1998, (11 pages).
Schneier, B., "Why Cryptography is Harder Than it Looks", Counterpane Systems, www.counterpane.com/publish.html, 1997, (8 pages).
Schneier, B., "Cryptographic Design Vulnerabilities", Counterpane Systems, www.counterpane.com/publish.html, Sep. 1998, (5 pages).
Bellare, Mihir and Rogaway, Phillip, "Entity Authentication and Key Distribution," Advances in Crypto 1993 Proceedings, Springer-Verlag (Aug. 1993).
Bird, R. et al, "The KryptoKnight Family of Light-Weight Protocols for Authentication and Key Distribution," IEEE/ACM Transactions on Networking, vol. 3, No. 1, pp. 31-41, IEEE Press, Piscataway, NJ, Feb. 1995.
Damgard, I.B., "A Design Principle for Hash Functions,", Springer-Verlag, New York, 1998.
Gong, L., "Using One-Way Functions for Authentication," ACM Sigcom computer Communication Review, vol. 19, Issue 5, pp. 8-11, New York, 1989.
Krawczyk, H., "SKEME: A Versatile Secure Key Exchange Mechanism for Internet," Proceedings of the 1996 Sympoium on Network and Distributed System Security (SNDSS) '96, pp. 114-127, IEEE Computer Society, Washington, DC (1996).
Leighton, T.and Micali, Silvio, "Secret Key Agreement without Public-Key Cryptography", Springer-Verlag, New York, 1998.
Matyas, S.M. & Meyer, C.H., "Generation, Distribution, and Installation of Cryptograpic Keys," 17 IBM Sys. J. 2 (1978).
Merkle, R., "One Way Hash functions and DES," In In G. Brassard, editor, Advances in Cryptology: Proceedings of CRYPTO'89, vol. 435 of Lecture Notes in Computer Science, pp. 428-446, Springer-Verlag, New York, 1990.
Molva, Reflik et al., "KryptoKnight Authentication and Key Distibution System," Computer Security—ESORICS 92 (Nov. 23-25, 1992).
Menezes, Alfred J. et al., Handbook of Applied Cryptography, CRC Press, Oct. 16, 1996.
Preneel, B., "MDx-MAC and Building Fast MACs from Hash Functions," Lecture Notes in Computer Science; vol. 963, Proceedings of the 15th Annual International Cryptology Conference on Advances in Cryptology, pp. 1-14, Springer-Verlag, London, UK (1995).
Schneier, Bruce, Applied Cryptography, Katherine Schowalter, 1996 (and first edition (1994) of same).
Freier, A. et al., "SSL Version 3.0," Netscape Communications Corporation, Dec. 1995.
RSA Laboratories, "PKCS #5: Password-Based Encryption Standard," version 1.5, Nov. 1993.
Rivest, R., "The MD5 Message-Digest Algorithm," IETF RFC 1321, Apr. 1992.
Berson, Thomas A., "Differential Cryptanalysis Mod 232 with Applications to MD5". EUROCRYPT. (1992).
Bert den Boer, Antoon Bosselaers (1993). Collisions for the Compression Function of MD5. Berlin; London: Soringer. ISBN 3-540-57600-2.
Kelsey, John et al., "Passphrase FAQ," alt.security.pgp, Oct. 1993.
"Windows '95 Vulnerabilities", US Department of Energy, Computer Incident Advisory Committee, available at http://ftp.cerias.purdue.edu/pub/lists/academic-firewalls/academic-firewalls.951224 (1995).
Carl Meyer and S.M. Matyas, Cryptography: A New Dimension in Computer Data Security (1982).
Hans Dobbertin, "Cryptanalysis of MD5 Compress," May 2, 1996.
Hans Dobbertin, "The Status of MD5 After a Recent Attack", RSA Laboratories; CryptoBytes, 1996.
Ehrsam, W.F. et al., "A Cryptographic Key Management Scheme for Implementing the Data Encryption Standard", IBM Sys. J., vol. 17 No. 2, 1978.
Cheng, P. et al., "Modular Key Management Protocol (MKMP)", Nov. 28, 1994.
RSA Laboratories, "PKCS #5 v2.0: PAssword-Based Cryptography Standard", Mar. 25, 1999.
U.S. Department of Commerce, National Institute of Standards and Technology, "Secure Hash Standard", FIPS PUB 180-1, Apr. 17, 1995. (24 pages).

(56) References Cited

OTHER PUBLICATIONS

International Preliminary Report on Patentability and the Written Opinion issued in PCT/US2010/028562; Dated: Oct. 6, 2011; (15 pages).
International Preliminary Report on Patentability and the Written Opinion issued in PCT/US2010/028565 Dated: Oct. 6, 2011; (16 pages).
International Preliminary Report on Patentability and the Written Opinion issued in PCT/US2010/028582; Dated: Oct. 6, 2011; (8 pages).
International Preliminary Report on Patentability and the Written Opinion issued in PCT/US2010/02853; Dated: Oct. 6, 2011; (9 pages).
International Preliminary Report on Patentability and the Written Opinion issued in PCT/US2010/028566; Dated: Oct. 6, 2011; (7 pages).
International Search Report and the Written Opinion issued in PCT/US2010/028566; Dated: Dec. 30, 2010; (10 pages).
International Search Report and the Written Opinion issued in PCT/US2010/028565; Dated: Oct. 6, 2010; (24 pages).
International Search Report and the Written Opinion issued in PCT/US2010/028562; Dated: Sep. 29, 2010; (24 pages).
Barrett, Daniel and Sliverman, Richard, "SSH, The Secure Shell: The Definitive Guide, 2nd Edition", O'Reilly Media, Section 2.4, Section 3.3, Section 3.4, Section 6.1-6.7. May 1, 2005.
Brenno de Winter; "Gnu Privacy Guard (GnuPG) Mini Howto"; retrieved from the Internet: http://www.gnupg.org/documentation/howtos.en.html, version 0.1.4; Aug. 10, 2004 (14 pages).
Yuill, J., Denning, D., Feer, F.; "Using Deception to Hide Things from Hackers: Processes, Principles, and Techniques", Journal of Information Warfare, 2006 (16 pages).

* cited by examiner

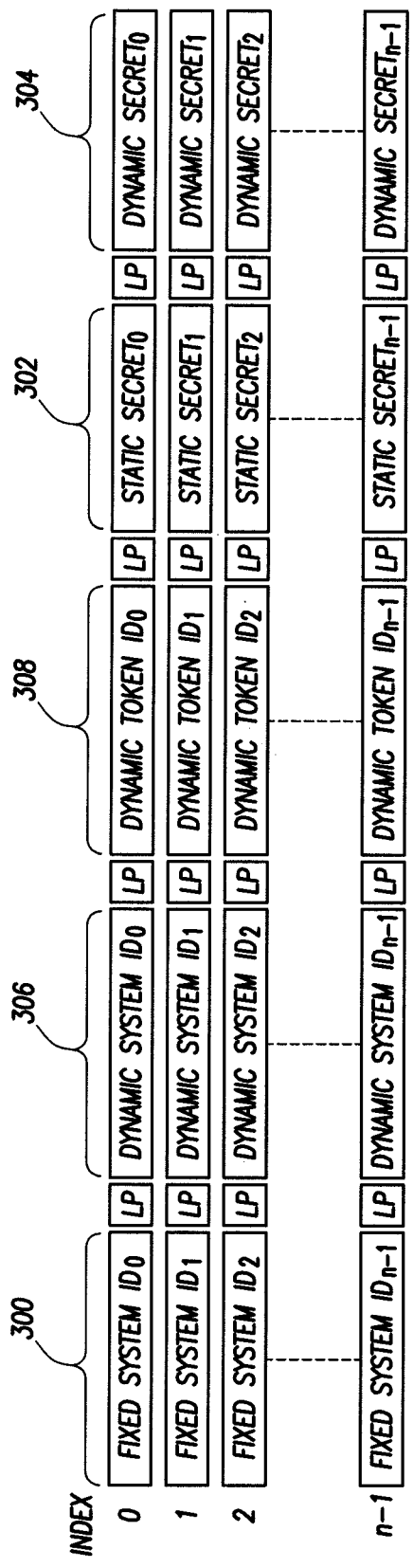
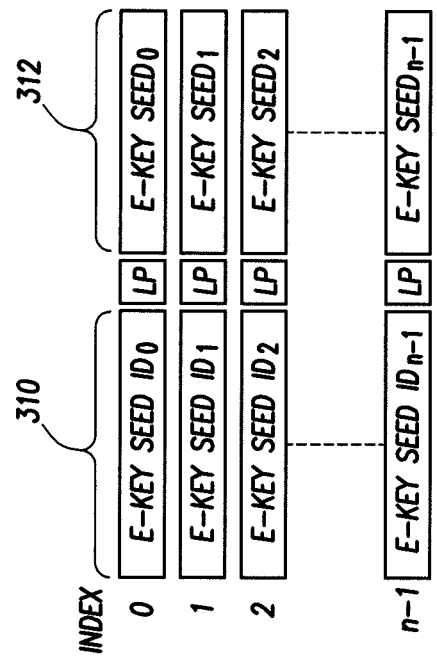
FIG.3B
FIG.3C

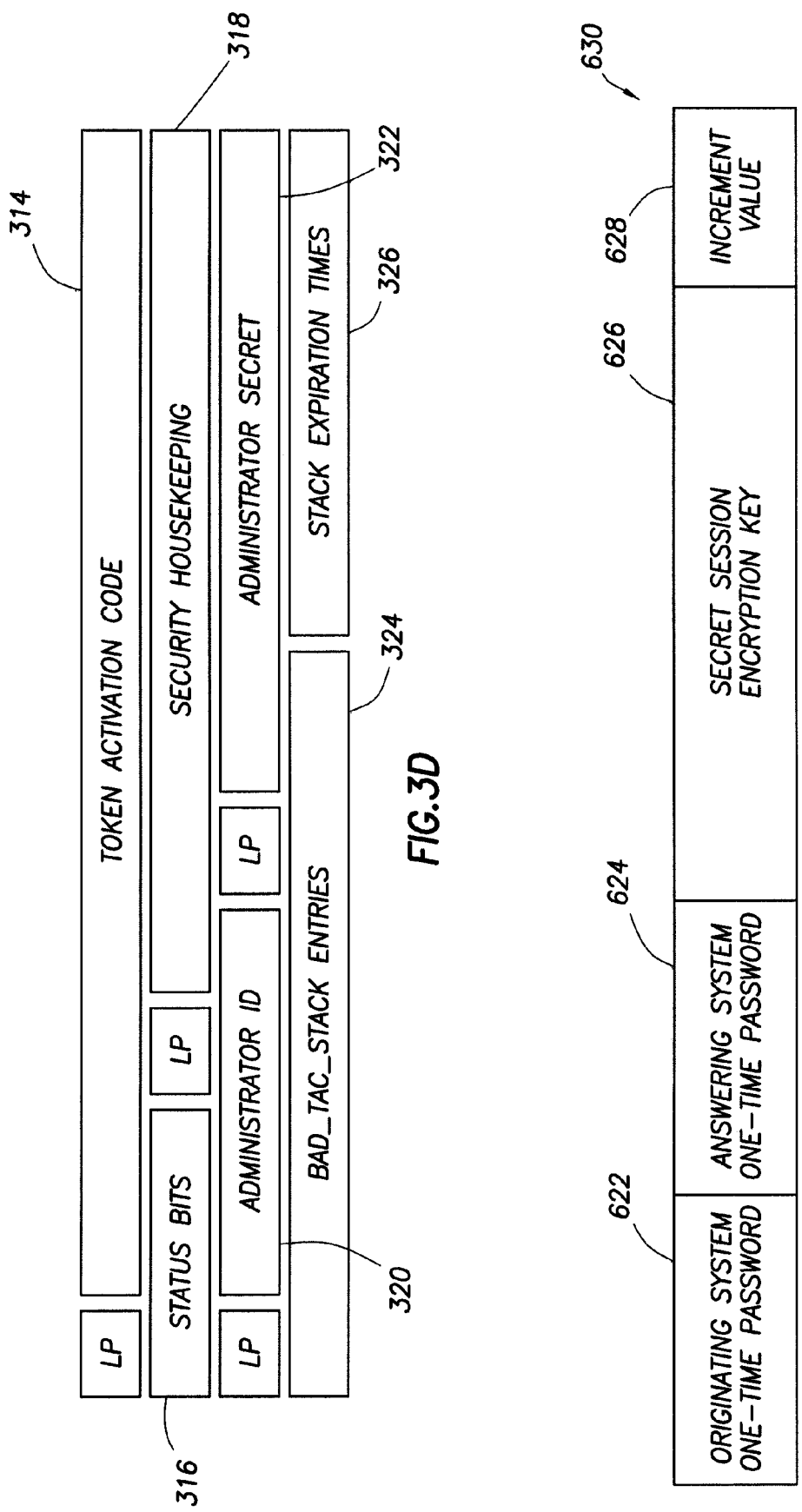

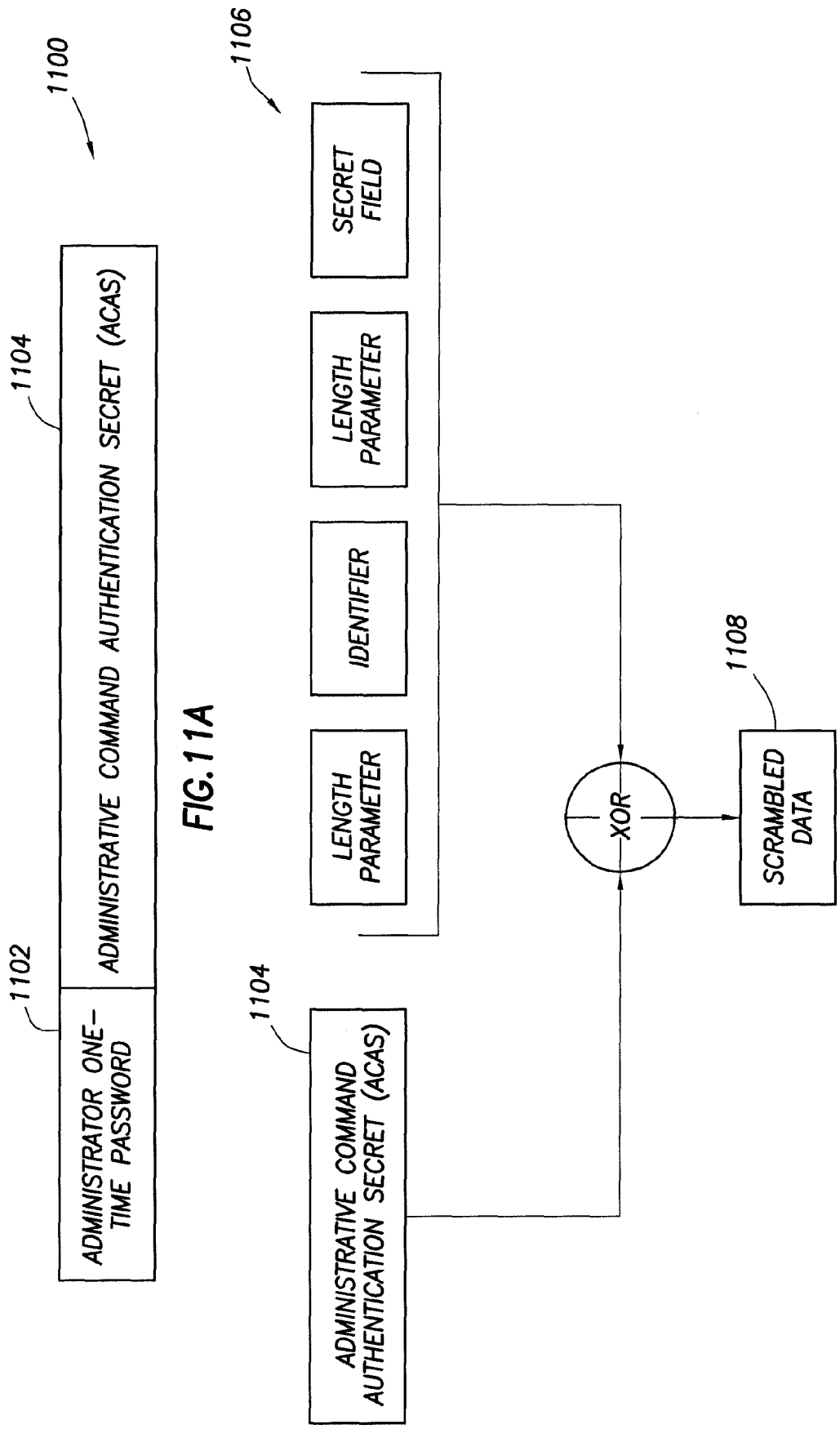

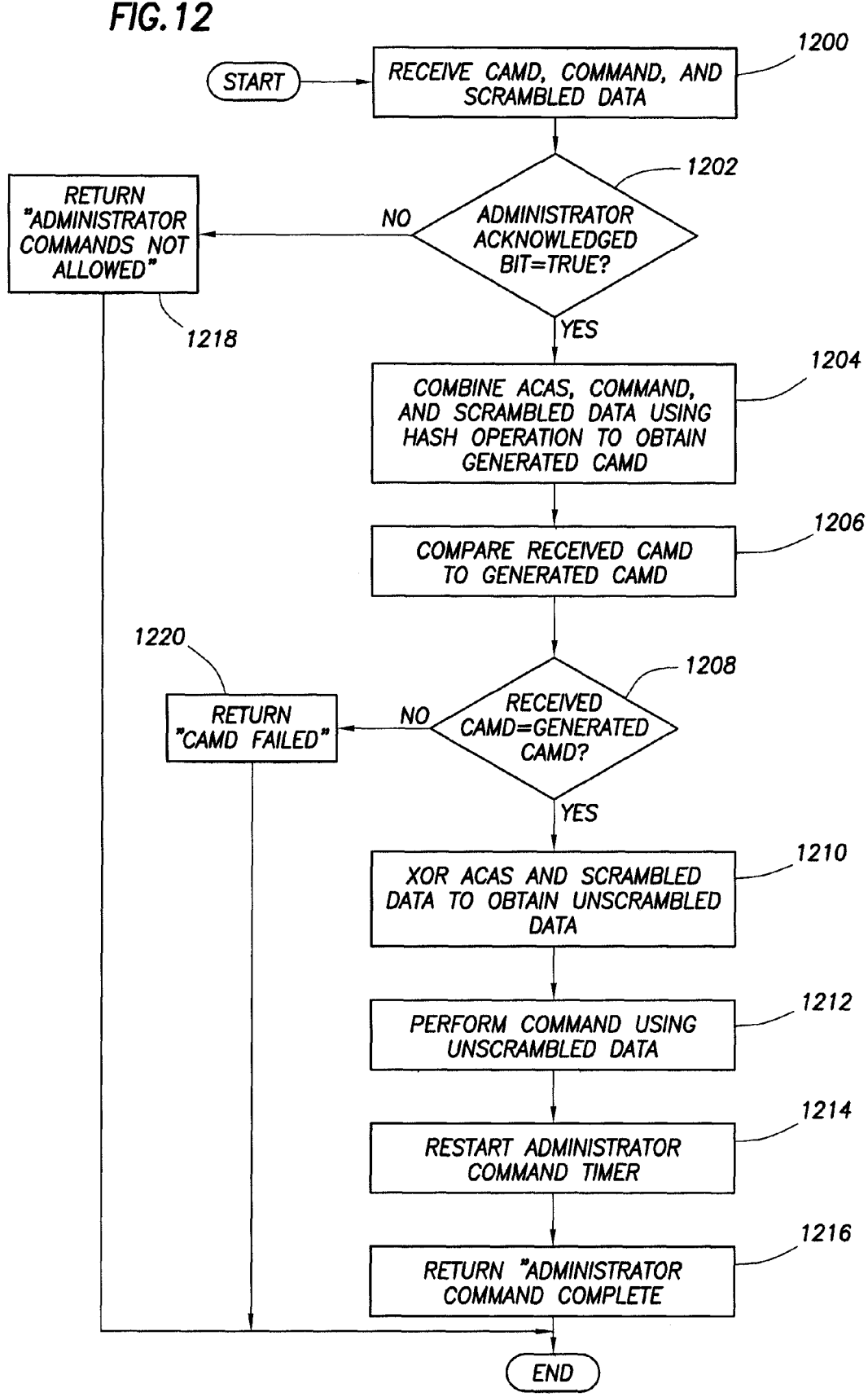

TOKEN FOR SECURING COMMUNICATION

CROSS-REFERENCE TO RELATED APPLICATIONS

The present application claims priority to PCT Application No. PCT/US10/28566 filed on Mar. 25, 2010, entitled, "TOKEN FOR SECURING COMMUNICATION," and incorporated herein by reference. PCT Application No. PCT/US10/28566 claims priority to U.S. Provisional Application No. 61/163,416 filed on Mar. 25, 2009 and entitled, "MULTI-PURPOSE SECURITY SYSTEM," and incorporated herein by reference.

BACKGROUND

The computer system assists in managing (e.g., storing, organizing, and communicating) a large amount of information. Some of the information managed by a computer system is confidential. In other words, access to such information is intended to be limited. Traditional protection schemes attempt to prevent unauthorized users from accessing the confidential information by requiring that a user provide authentication credentials, at a predefined entry point, to access an account that includes the confidential information. Protecting only the predefined entry points, however, fails to account for nefarious individuals creating other entry points by exploiting computer system vulnerabilities. For example, knowledge of a user's hardware and software system, system configuration, types of network connections, etc. may be used to create an entry point and gain access to the confidential information.

In order to prevent unauthorized access to the confidential information, the confidential information may be encrypted. Encryption is a process of transforming the clear text confidential information into an encrypted format that is unreadable by anyone or anything that does not possess the corresponding decryption key. An encryption algorithm and an encryption key are used to perform the transformation. Encryption technology is classified into two primary technology types: symmetric encryption technology and asymmetric encryption technology. Symmetric encryption technology uses the same encryption key to both encrypt and decrypt confidential information. Asymmetric encryption technology uses a pair of encryption keys: the pair of keys are related such that information encrypted using one of the encryption keys can only be decrypted using the other encryption key of the pair.

SUMMARY

In general, in one aspect, the invention relates to a method for performing a command on a token. The method includes receiving a first command authentication message digest (CAMD), a command, and scrambled data from a sender, and making a first determination that the sender is allowed to send commands to the token. Based on the first determination, the method further includes generating a second CAMD on the token using the command, the scrambled data, and an Administrative Command Authentication Secret (ACAS), making a second determination that the first CAMD and the second CAMD match, and performing the command by the token based on the second determination.

In general, in one aspect, the invention relates to a token, including a processor, and a computer readable medium comprising computer readable program code embodied therein, which when executed by the processor, perform a method, the method including, receiving a first command authentication message digest (CAMD), a command, and scrambled data from a sender, making a first determination that the sender is allowed to send commands to the token, based on the first determination: generating a second CAMD on the token using the command, the scrambled data, and an Administrative Command Authentication Secret (ACAS), making a second determination that the first CAMD and the second CAMD match, and based on the second determination, performing the command by the token.

In general, in one aspect, the invention relates to a token, including integrated circuits configured to perform a method, the method including receiving a first command authentication message digest (CAMD), a command, and scrambled data from a sender, making a first determination that the sender is allowed to send commands to the token, based on the first determination: generating a second CAMD on the token using the command, the scrambled data, and an Administrative Command Authentication Secret (ACAS), making a second determination that the first CAMD and the second CAMD match, and based on the second determination, performing the command by the token.

In general, in one aspect, the invention relates to computer readable medium including computer readable program code embodied therein for causing a token to perform a method, the method including receiving a first command authentication message digest (CAMD), a command, and scrambled data from a sender, making a first determination that the sender is allowed to send commands to the token, based on the first determination: generating a second CAMD on the token using the command, the scrambled data, and an Administrative Command Authentication Secret (ACAS), making a second determination that the first CAMD and the second CAMD match, and based on the second determination, performing the command by the token.

Other aspects of the invention will be apparent from the following description and the appended claims.

BRIEF DESCRIPTION OF DRAWINGS

FIGS. 3A-3D show data structures in accordance with one or more embodiments of the invention.

FIGS. 4-6A, 7-10 and 12 show flowcharts in accordance with one or more embodiments of the invention.

FIGS. 6B and 11A-11C show message digests and/or commands in accordance with one or more embodiments of the invention.

DETAILED DESCRIPTION

Figure 1:
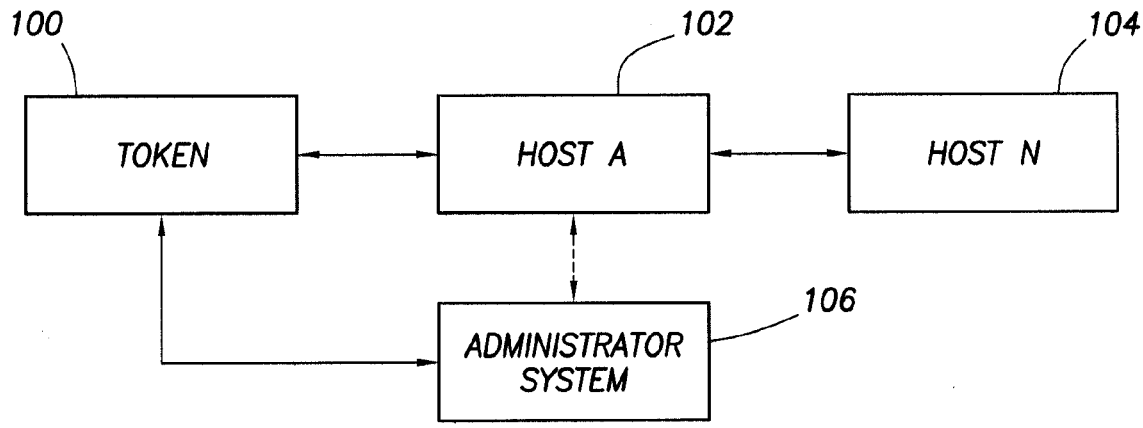
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to tokens for securing communication between computing devices. More specifically, the token is configured to authenticate the computing device to which it is connected and, upon successful authentication, provide the computing device with an encryption key. More specifically, in one embodiment of the invention, the computing device may subsequently request the generation of an encryption key from the token and then use the generated encryption key to encrypt/decrypt communications with other computing devices. Further, embodiments of the invention relate to securely updating the token by an administrator.

FIG. 1 shows a system in accordance with one or more embodiments of the invention. The system includes a token (100), hosts (e.g., Host A (102), Host N (104)), and an Administrator System (106). Each of the aforementioned systems is described below.

In one embodiment of the invention, the token corresponds to any device configured to perform the functions (and or store data) as described below with respect to FIGS. 3A-12. Two exemplary tokens are described below in FIGS. 2A and 2B. In general, referring to FIG. 1, the token (100) includes functionality to connect (in a contact and/or contactless manner) with a host (e.g., Host A (102)). In addition, the token includes functionality to connect (in a contact and/or contactless manner) with an administrator system (106). Examples of tokens include, but are not limited to, a laptop computer, a desktop computer, a smart card, a smart phone, and a small footprint computing device (e.g., netbook) that includes the components shown in FIG. 2A.

Continuing with the discussion of FIG. 1, each of the hosts (e.g., Host A (102), Host N (104)), and the administrator system (106) are computing devices. In one embodiment of the invention, a computing device is any physical or virtual device that may be used for performing various embodiments of the invention (as described below). The physical device may correspond to any physical system with functionality to implement one or more embodiments of the invention. For example, the physical device may be implemented on a general purpose computing device (i.e., a device with a processor(s) and an operating system) such as, but not limited to, a desktop computer, a laptop computer, a gaming console, a mobile device (e.g., a mobile phone, a smart phone, a personal digital assistant, a gaming device, etc.).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that includes a general purposes processor(s) and an application-specific processor(s)/hardware. In such cases, one or more portions of the invention may be implemented using the operating system and general purpose processor(s), and one or more portions of the invention may be implemented using the application-specific processor(s)/hardware.

The virtual device may correspond to a virtual machine. Broadly speaking, the virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures. VMware® is a registered trademark of VMware, Inc. Xen® is a trademark overseen by the Xen Project Advisory Board.

Further, regardless of the implementation of the hosts and the administrative system, the hosts and administrative systems may include (or be operatively connected to) one or more of the following: associated memory (e.g., random access memory (RAM), cache memory, flash memory, etc.), a storage device (e.g., a hard disk, an optical drive such as a compact disk drive or digital video disk (DVD) drive, a flash memory stick, etc.), one or more input mechanisms (e.g., a keyboard, a touch screen, a mouse, a microphone), a display (e.g., a liquid crystal display (LCD), a plasma display, or cathode ray tube (CRT) monitor), speakers, and one or more communication interfaces (e.g., a network interface (wired and/or wireless), a Bluetooth Interface, a Universal Serial Bus (USB) interface, a Firewire interface, etc.)

Figure 2A:
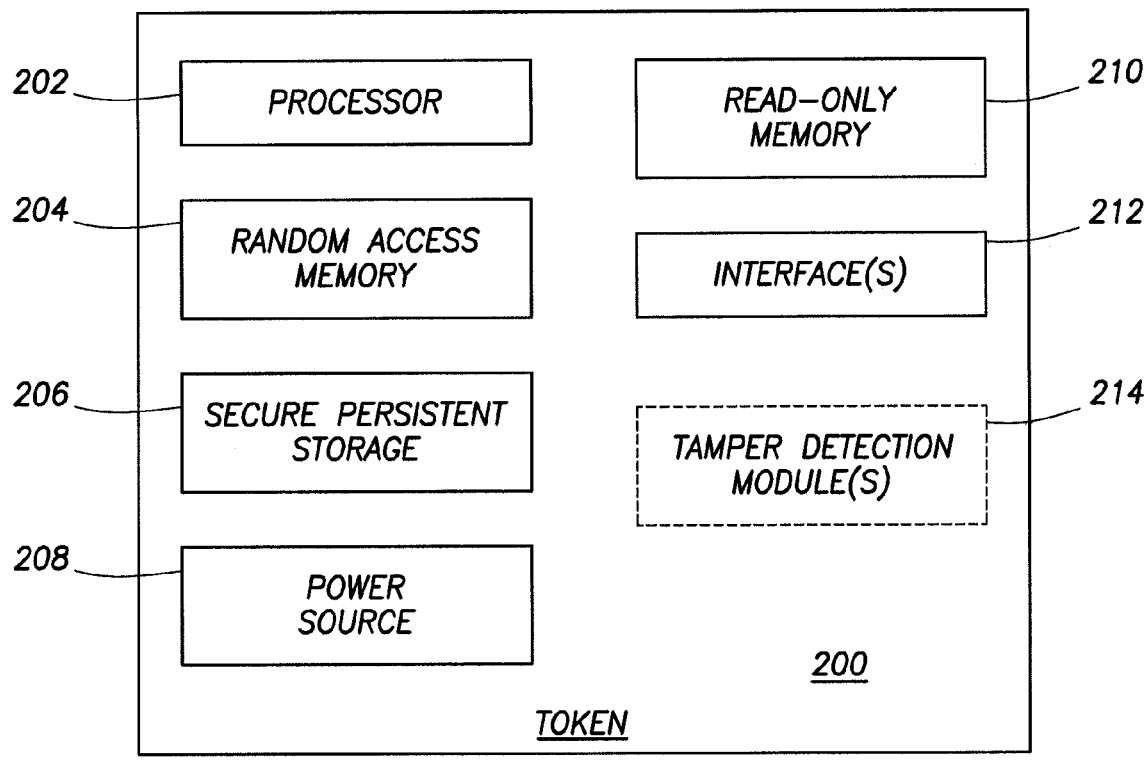
FIGS. 2A-2B show schematic diagrams of tokens in accordance with one or more embodiments of the invention.

FIG. 2A shows a token in accordance with one or more embodiments of the invention. The token (200) includes a processor (202), Random Access Memory (RAM) (204), secure persistent (non-volatile) storage (206), a power source (208), read-only memory (210), one or more interfaces (212), and, optionally, a tamper detection module(s) (214). Each of these components is described below.

The processor (202) corresponds to any family of integrated circuits configured to execute machine readable instructions. The particular processor (202) selected for the token (200), may depend on, for example, the size of the token, the desired computing power of the token, the desired power usage of the token, and/or the cost of the token.

The random access memory (RAM) (204) is volatile memory configured to temporarily store various data generated and/or obtained during the execution of one or more functions of the token (as described below). Data may be written to and read from the RAM (204). The size of the RAM (204) may vary across implementations of the token (200). The contents of the RAM are cleared (or rendered un-readable) when power to the token is lost.

The secure persistent storage (206) corresponds to a persistent storage (e.g., non-volatile) that is secured physically and/or electronically from unauthorized access. Data may be written to and read from the secure persistent storage. An example of physical security of the secure persistent storage (206) may correspond to detection of physical tampering of the secure persistent storage (206) by the tamper detection module(s) (214). Depending on the type of tamper detection implemented by the token, the token may include one or more tamper detection modules. Examples of electronic security of the secure persistent storage may correspond to (i) encryption of data stored in the secure physical storage; and (ii) monitoring of access attempts (e.g., how many times incorrect Token Access Codes (TACs) were submitted to the token), etc. The electronic security may be implemented by the token (200) (in particular the operating system or application stored on the token (discussed below)).

Regardless of what attempts are used to breach the security measures of the token, the detection of an attempt or actual breach (physical and/or electronic) may result in rendering the secure persistent storage physically inaccessible and/or (ii) clearing (or otherwise rendering unusable) the content of the secure persistent storage. The tamper detection module(s) (214) are configured to implement one or more of the above responses based on a detection of an attempted (or actual) breach.

The power source (208) corresponds to any direct current power source used to power the various components of the token (200). The power source (208) may be configured to power only a subset of components on the token when the token is not being actively used. The subset of components may be used to ensure the integrity of the token from tampering. In such cases, when the token (200) is being actively used, the token (200) includes functionality to use external DC and/or alternating current (AC) to power various components on the token. Alternatively, the power source (200) is used to power all components on the token (200) during active use of the token. In such cases, the token (200) may include functionality to recharge the power source (208).

The read-only memory (ROM) (210) includes machine-readable instructions (or instructions that may be converted into machine-readable instructions) that are executable by the processor (202) to perform the various functions of the token described below. Once the token (200) is deployed for use, the data in the ROM may be read-only. Further, the token (200) may include functionality to update and/or upgrade the data in the ROM (210). In one embodiment of the invention, the ROM may be updated by an administrator using, for example, the process described in FIGS. 10-12 below.

As an alternative, the token (200) may include additional persistent storage (secured or non-secured) instead of the ROM, which includes machine-readable instructions (or instructions that may be converted into machine-readable instructions) that are executable by the processor (210) to perform the various functions of the token described below. Regardless of the implementation, the machine-readable instructions (or instructions that may be converted into machine-readable instructions) correspond to instructions to implement an operating system (OS) and an application configured to perform the various functions of the token described below. In one embodiment of the invention, the OS corresponds to any instructions configured to receive application calls from the application, send corresponding system calls to the processor, receive a response from the processor, and send the response to the application.

In another alternate embodiment, the token (200) may include the OS and the aforementioned application in the secure persistent storage (206). In such cases, the token (200) may not include ROM (210) (or at least not use the ROM to store the aforementioned OS and application). In another alternate embodiment, the OS may be located in ROM (210) and the aforementioned application may be located in the additional persistent storage or in the secure persistent storage.

Continuing with the discussion of FIG. 2A, the token (200) may include one or more interfaces (212). The interface(s) (212) is configured to enable the token (200) to receive data from and transmit data to hosts and the administrative system. Each interface(s) (212) may correspond to a contactless interface (e.g., Bluetooth interface, an infrared (IR) interface, a Radio-Frequency Identification (RFID) interface, a wireless networking interface, interfaces compliant with ISO/IEC 14443 standard, etc.) or a contact interface (e.g., wired network interface, serial cable interface, parallel cable interface, Universal Serial Bus (USB) interface, IEEE 1394 (e.g., FireWire) interface, interfaces compliant with ISO/IEC 7816 standard, etc.).

Figure 2B:
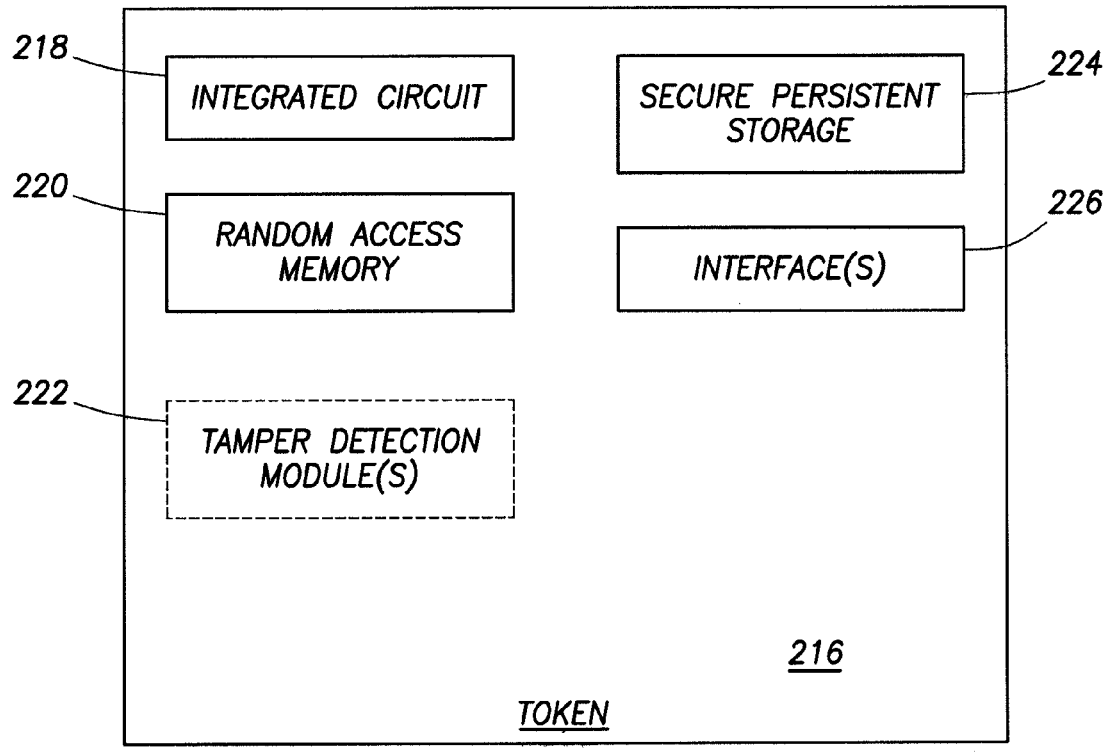

FIG. 2B shows a token in accordance with one or more embodiments of the invention. The token (216) includes an integrated circuit (218), RAM (220), secure persistent storage (224), one or more interfaces (226), and, optionally, a tamper detection module (222). Each of these components is described below.

The integrated circuit (218) is a family of circuits configured to implement the functionality of the token (as described below). In one or more embodiments of the invention, the implementation of the integrated circuit (218) may comply with ISO/IEC 7810, ISO/IEC 7813, ISO/IEC 7811, and/or ISO/IEC 7816. In other embodiments of the invention, the integrated circuit may be implemented to comply with other industry standards.

The RAM (220) includes the same functionality (or similar) as the RAM (204). However, in one or more embodiments of the invention, the implementation of the RAM (220) may comply with ISO/IEC 7810, ISO/IEC 7813, ISO/IEC 7811, and/or ISO/IEC 7816. In other embodiments of the invention, the RAM may be implemented to comply with other industry standards.

The token (216) may include one or more interfaces (226). The interface(s) (226) includes the same (or similar) functionality as the interface (212). However, in one or more embodiments of the invention, the implementation of the interface (226) may comply with ISO/IEC 7810, ISO/IEC 7813, ISO/IEC 7811, and/or ISO/IEC 7816. In other embodiments of the invention, the interface(s) may be implemented to comply with other industry standards.

The secure persistent storage (224) includes the same (or similar) functionality as the secure persistent storage (206) (see FIG. 2A). However, in one or more embodiments of the invention, the implementation of the secure persistent storage (224) may comply with ISO/IEC 7810, ISO/IEC 7813, ISO/IEC 7811, and/or ISO/IEC 7816. In other embodiments of the invention, the secure persistent storage may be implemented to comply with other industry standards.

The token (216) may optionally include a tamper detection module(s) (222). Depending on the type of tamper detection implemented by the token, the token may include one or more tamper detection modules. The tamper detection module(s) (222), includes the same (or similar) functionality with tamper detection module(s) (214) (see FIG. 2A). However, in one or more embodiments of the invention, the implementation of the tamper detection module(s) (222) may comply with ISO/IEC 7810, ISO/IEC 7813, ISO/IEC 7811, and/or ISO/IEC 7816. In other embodiments of the invention, the tamper detection module(s) may be implemented to comply with other industry standards.

In addition, the tamper detection module(s) (222) may include tamper detection technology that is part of ISO/IEC 7810, ISO/IEC 7813, ISO/IEC 7811, and/or ISO/IEC 7816. Regardless of the tamper detection module(s) (222) and/or tamper detection technology implemented in the token (216), the result of a detection of tampering and/or an attempted breach results in responses described above with respect to FIG. 2A.

In one embodiment of the invention, the token (216) may be solely externally powered, for example, through an interface (226). Further, the token (216) may be powered in the same manner as the token (200) described in FIG. 2A.

FIGS. 3A-3D show data structures in accordance with one or more embodiments of the invention.

Figure 3A:
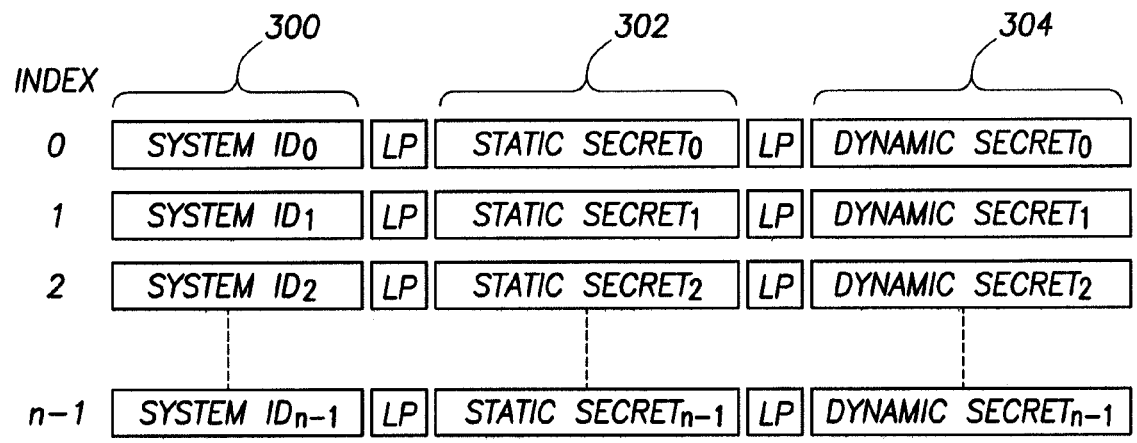

Referring to FIG. 3A, FIG. 3A shows a data structure which may be located in the secure persistent storage of a token, and which may associate a system identification (ID) (300) with a static secret (302)—dynamic secret (304) pair. The system ID (300) corresponds to an identification of a host and may be a numeric, alpha only, or alpha-numeric value. The aforementioned values may be stored in the token using one or more of the following formats: (i) American Standard Code for Information Exchange (ASCII); (ii) Universal Character Set (UCS) defined by ISO/IEC 10646; and (iii) Unicode. The static secret (302) corresponds to a secret value that is associated with the particular system ID. The static secret is used to generate a secret session encryption key and authenticate the host (corresponding to the system ID) to the token (see FIGS. 6A and 6B below). The static secret typically does not change for the duration that the corresponding system ID is present in the secure persistent storage. The dynamic secret (304) corresponds to a secret value that is associated with the particular system ID. The dynamic secret is used to generate a secret session encryption key and authenticate the host (corresponding to the system ID) to the token (see FIGS. 6A and 6B below). The dynamic secret may change often. For example, the dynamic secret may change at the end of every authentication session such that the next time the host authenticates to the token a different dynamic secret is used. The dynamic secret may be updated to obtain a new dynamic secret using the current dynamic secret, the increment value, and an n-bit generator (discussed below). In one embodiment of the invention, the dynamic secret for each system ID may be pre-stored in the token.

Referring to FIG. 3B, FIG. 3B shows a data structure which may be located in the secure persistent storage of a token.

With respect to the data structure, the data structure associates a system identification (ID) (also denoted as Fixed System ID) (300) with a dynamic system ID (306), a dynamic token ID (308), and a static secret (302)—dynamic secret (304) pair. The system ID (300), the static secret (302), and the dynamic secret (304) are described above with respect to FIG. 3A.

The dynamic system ID (306) corresponds to a system ID that changes over time. For example, the dynamic system ID (306) may change after the host is authenticated to the token. In such cases, the current dynamic system ID (306) is overwritten with a new dynamic system ID. The new dynamic system ID (306) may be generated using, for example, an n-bit generator, the current dynamic system ID, and an increment value. In one embodiment of the invention, the initial dynamic system ID (306) may be pre-stored in the token. The dynamic token ID (308) corresponds to a token ID (i.e., an ID that identifies the token) that changes over time. The dynamic token ID (308) may be a numeric, alpha only, or alpha-numeric value. The aforementioned values may be stored in the token using one or more of the following formats: (i) American Standard Code for Information Exchange (ASCII); (ii) Universal Character Set (UCS) defined by ISO/IEC 10646; and (iii) Unicode. The dynamic token ID (308) may change after the host is authenticated to the token. In such cases, the current dynamic token ID (308) is overwritten with a new dynamic token ID. The new dynamic token ID (308) may be generated using, for example, an n-bit generator, the current dynamic token ID, and an increment value. In one embodiment of the invention, the initial dynamic token ID (308) may be pre-stored in the token. In one or more embodiments of the invention, the dynamic system and dynamic token IDs may be used to provide an additional layer of security. Specifically, a nefarious entity may record the dynamic system and dynamic token IDs for a given communication session; however, because the dynamic system and dynamic token IDs change often (e.g., at the end of a previous communication session), such information will not be of use to the nefarious entity if they attempt a playback attack using the previous values of the dynamic system and dynamic token IDs.

In one embodiment of the invention, the dynamic system ID (306), the dynamic token ID (308), the static secret (302), and the dynamic secret (304) may be used as inputs into an n-bit generator to generate a secret session encryption key (see FIGS. 6A and 6B). In other embodiments of the invention, one or more of the dynamic system ID (306), the dynamic token ID (308), the static secret (302), and the dynamic secret (304) may not be used as input into the n-bit generator.

In one embodiment of the invention, the dynamic and static secrets described in FIGS. 3A and 3B are not transmitted from the token to the host or from the token to the administrator. Rather, in such embodiments, the token may receive, from the administrator, the dynamic and static secrets (see e.g., FIGS. 10-12), which are used internally but the token (see e.g., FIGS. 6A-7).

Referring to FIG. 3C, FIG. 3C shows a data structure which may be located in the secure persistent storage of a token. Specifically, the data structure includes E-Key seed identifications (IDs) (310) and corresponding E-Key Seeds (312). The E-Key Seed IDs (310) are used to identify the E-Key Seeds (312) and may be represented as a numeric, alpha only, or alpha-numeric value. The aforementioned values may be stored in the token using one or more of the following formats: (i) American Standard Code for Information Exchange (ASCII); (ii) Universal Character Set (UCS) defined by ISO/IEC 10646; and (iii) Unicode. The E-Key Seeds may be a numeric, alpha only, or alpha-numeric values and are used to generate encryption keys (see FIG. 8). The aforementioned values may be stored in the token using one or more of the following formats: (i) American Standard Code for Information Exchange (ASCII); (ii) Universal Character Set (UCS) defined by ISO/IEC 10646; and (iii) Unicode.

Referring to FIG. 3D, FIG. 3D shows a data structure which may be located in the secure persistent storage of a token. Specifically, the data structure includes a Token Activation Code (TAC) (TAC) (314), status bits (316), security housekeeping information (318), an administrator ID (320), an administrator secret (322), BAD_TAC_Stack entries (324), and Stack Expiration Times (326). In addition, the data structure shown in FIG. 3D may include various length parameter (LP) fields denoting the length (in bits) of the corresponding field. Each of these components is described below.

The TAC (314) is a password/phrase used to activate the token (see FIGS. 5 and 9) and may be represented as a numeric, alpha only or alpha-numeric value. The aforementioned values may be stored in the token using one or more of the following formats: (i) American Standard Code for Information Exchange (ASCII); (ii) Universal Character Set (UCS) defined by ISO/IEC 10646; and (iii) Unicode. The Status bit(s) (316) are used to indicate whether the token is active, inactive, locked, (as well as other status information about the token) (discussed below). The security housekeeping information (318) includes a log that tracks various events the token has undergone. Non-limiting examples of events include when and where the token has been used. The administrator ID (320) identifies the administrator of the token and may be represented as a numeric, alpha only or alpha-numeric value. The aforementioned values may be stored in the token using one or more of the following formats: (i) American Standard Code for Information Exchange (ASCII); (ii) Universal Character Set (UCS) defined by ISO/IEC 10646; and (iii) Unicode. The administrator secret (322) is used as to authenticate the administrator (or administrator system) to the token (see FIG. 10) and to authenticate commands sent by the administrator (administrator system) to the token. The token may include multiple administrator IDs and corresponding administrator secrets. The BAD_TAC_Stack entries (324) and Stack Expiration Times (326) are used to track the number of times the host (or a user of a host) unsuccessfully attempts to activate the token (see FIG. 5). The number of entries in the BAD_TAC_Stack may vary based on the implementation.

The data structures shown in FIGS. 3A-3D are intended to be logical representations of the data stored in the token. The actual data structures implemented within the token to store the aforementioned data may vary from implementation to implementation without departing from the invention.

FIGS. 4-6A, 7-10 and 12 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 4:
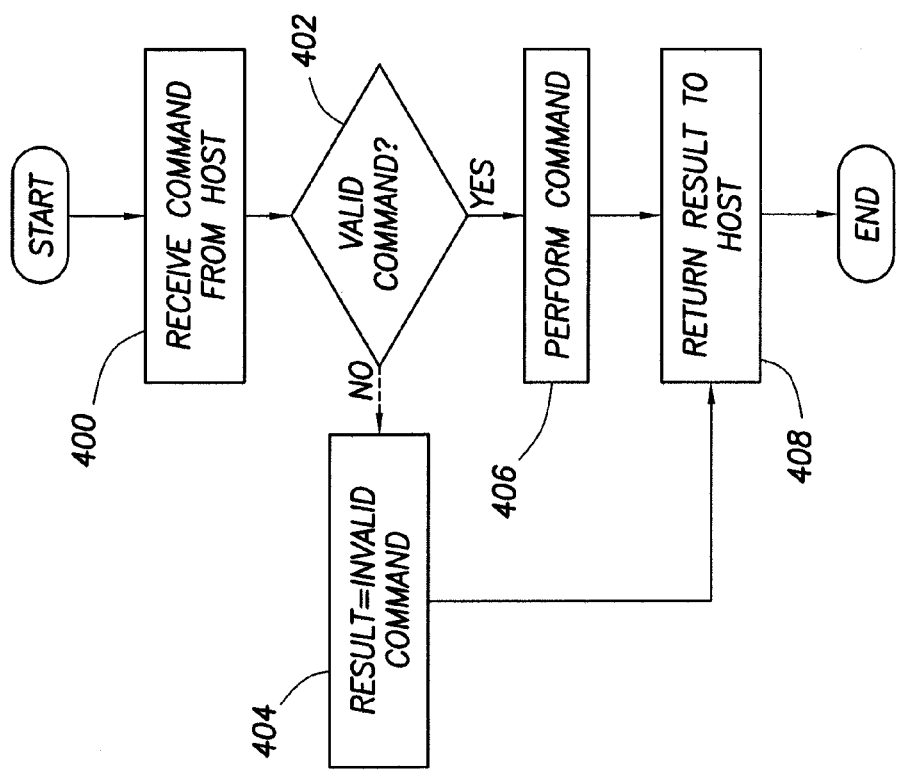

Referring to FIG. 4, FIG. 4 shows a method for processing a command, received from a host, on a token. In Step 400, a command is received from a host. In one embodiment of the invention, the token is connected to the host in a contact or contactless manner (see FIG. 1).

In Step 402, a determination is made about whether the command is valid. Specifically, a determination is made about whether the command is a command than the token understands (i.e., the token can perform). If the command is valid, the process proceeds to Step 406; otherwise, the process proceeds to Step 404. In Step 404, the token returns a result to the host indicating that the command is invalid. In Step 406, the command is performed by the token. In Step 408, the results of performing the command are returned to the host.

Examples of commands that may be requested by the host and performed by the token include, but are not limited to, the commands in Table 1.

TABLE 1

Figure 5:
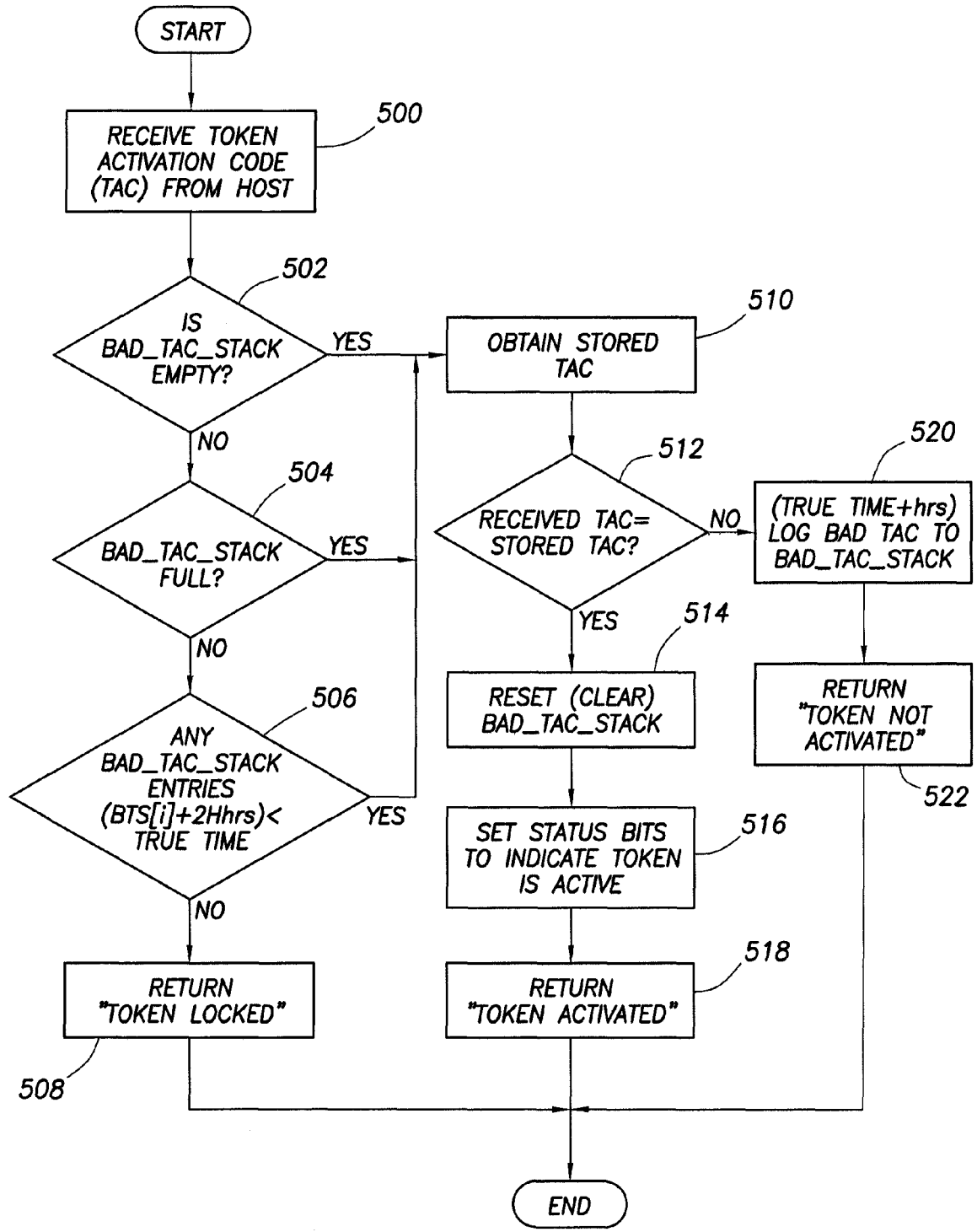
Figure 6:
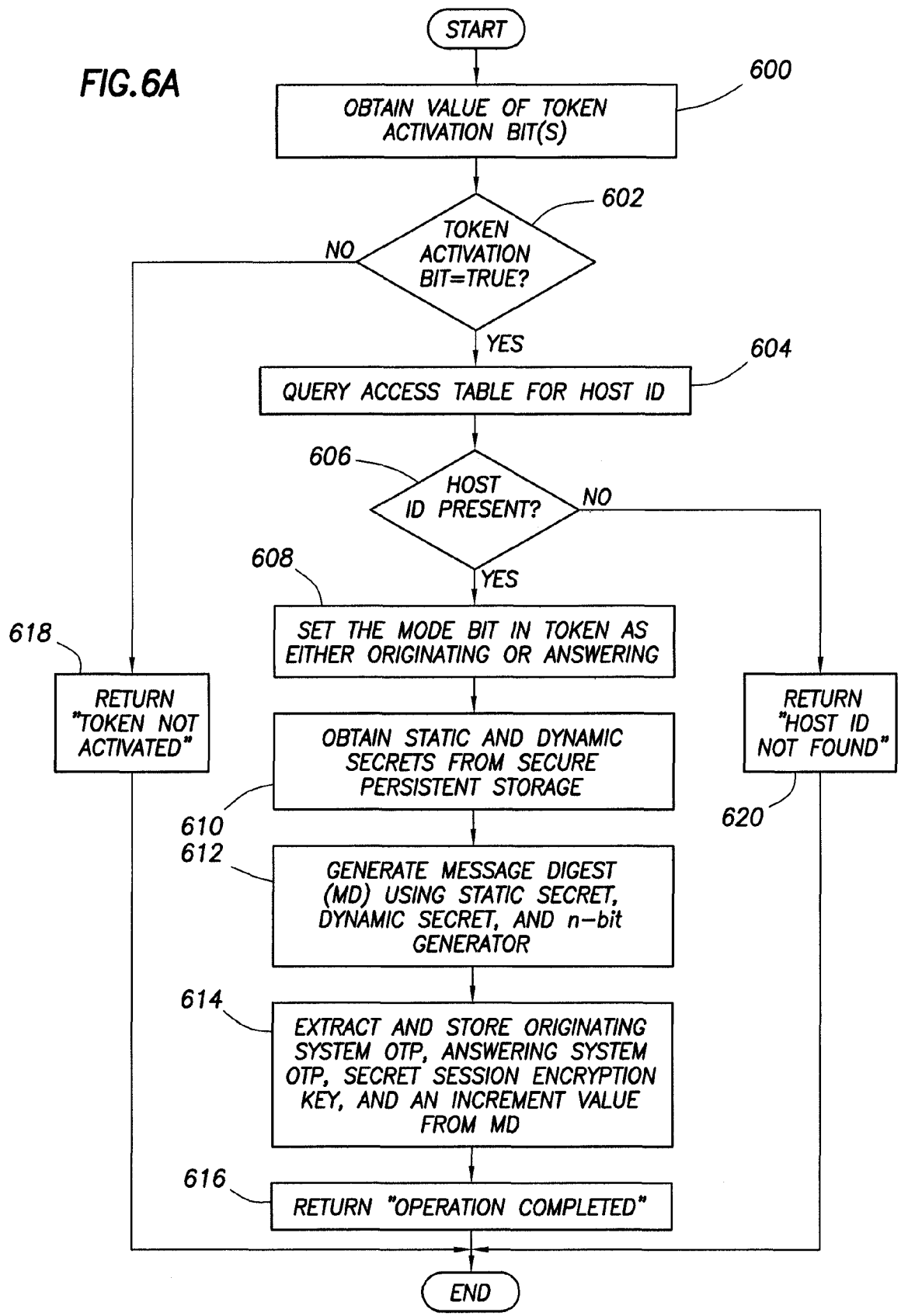

| Token Commands Initiated by Host | |
|---|---|
| Command | Short Description of Command |
| Activate Token | Command allows host to provide TAC to token in order to activate the token for subsequent use (see FIG. 5). The result of the command is an activated token or a response that the token is still inactive. |
| Begin Authentication | Command initiates the generation of one-time passwords (OTPs), a secret session encryption key, and an increment value in the token. (See FIGS. 6A, 6B) |
| Authenticate Host | Command authenticates host to token using OTP (See FIG. 7) |
| Generate Encryption Key | Command initiates the generation of a new encryption key using an E-Key Seed. (See FIG. 8) |
| Change TAC | Command is used to change the TAC stored in the token. |

Referring to FIG. 5, FIG. 5 shows a method for performing the Activate Token command. In Step 500, a TAC is received from the host. In Step 502, a determination is made about whether the BAD_TAC_Stack is empty. If the BAD_TAC_Stack is empty, the process proceeds to Step 510; otherwise the process proceeds to Step 504. In Step 504, a determination is made about whether the BAD_TAC_Stack is full (i.e., all entries in the BAD_TAC_Stack are currently being used to store information about unsuccessful TAC submissions). If the BAD_TAC_Stack is full, the process proceeds to Step 506; otherwise the process proceeds to Step 510.

In Step 506, a determination is made about whether any of the BAD_TAC_Stack entries have timed out. Specifically, do any of the entries in the BAD_TAC_Stack include a time stamp that is more than 24 hours old. Other time frames (i.e., time frames other than 24 hours) may be used without departing from the invention. If any of the BAD_TAC_Stack entries have timed out, the process proceeds to Step 510; otherwise the process proceeds to Step 508. In Step 508, the token is locked and the host is notified accordingly. In one embodiment of the invention, once the token is locked, no commands may be performed on the token for a specified period of time and/or unless the administrator unlocks the token (using, for example, an unlock command issued in accordance with FIGS. 10-12 below).

In Step 510, the stored TAC is obtained from the secure persistent storage on the token. In Step 512, the received TAC (i.e., the TAC received in Step 500) is compared with the stored TAC (i.e., the TAC obtained in Step 510) to determine whether they match. If the received TAC matches the stored TAC, then the process proceeds to Step 514; otherwise the process proceeds to Step 520. In Step 514, the BAD_TAC_Stack entries are cleared. In Step 516, the appropriate status bits in the token are set to indicate the token is active. In Step 518, the token notifies the host that the token is now active.

In Step 520, a BAD_TAC_Stack entry is created that includes a timestamp obtained using the current time plus 24 hours (or another timeframe as discussed above with respect to Step 506). In Step 522, the host is notified that the token was not activated.

While FIG. 5 refers to a "Stack" the BAD_TAC_Stack may be implemented using other data structures and is not limited to a stack data structure.

Referring to FIG. 6A, FIG. 6A shows a method for the generation of one-time passwords (OTPs), a secret session encryption key, and an increment value in the token.

In Step 600, the value of the token activation bit(s) is obtained from the status bits in the secure persistent storage. In Step 602, a determination is made about whether the token is active. If the token is active, the process proceeds to Step 604; otherwise the process proceeds to Step 618.

In Step 604, the access table is queried to determine whether the host ID is present. The host ID corresponds to the ID of the host that sent the Begin Authentication command to the token. In one embodiment of the invention, the access table is located in the secure persistent storage and includes all host IDs from which the token is currently able to accept commands.

In Step 606, a determination is made about whether the host ID is present in the access table. If the host ID is present in the access table, the process proceeds to Step 608; otherwise the process proceeds to Step 620.

In Step 608, the mode bit in the token is set as either originating or answering. The designation of originating or answering is required for the host to authenticate itself to the token (see FIG. 7) as well as for the token to authenticate itself to the host. The mode bit may be included as part of the status bit(s) (316) (see FIG. 3D).

In Step 610 of FIG. 6A, the static secret and dynamic secret corresponding to the host ID (which may also be designated as the system ID) are obtained from the secure persistent storage (see FIG. 3A). In an alternate embodiment, the dynamic system ID, dynamic token ID, the static secret, and the dynamic secret corresponding to the host ID (which may also designated as the fixed system ID) are obtained from the secure persistent storage (see FIG. 3B).

In Step 612, a message digest is generated using the static and dynamic secrets (or the dynamic system ID, dynamic token ID, the static secrets, and the dynamic secrets) as inputs to an n-bit generator. An exemplary message digest is shown in FIG. 6B. Referring to FIG. 6B, the message digest (630) may be sub-divided into four (or more) portions. In the message digest shown in FIG. 6B, the message digest includes an originating system OTP (622), an answering system OTP (624), a session encryption key (626), and an increment value (628). The length of the message digest may vary depending on the implementation. Further, the length of the individual components in the message digest as well as the order of the individual components within the message digest may vary based on the implementation.

Returning to FIG. 6A, in one or more embodiments of the invention, an n-bit generator (implemented in software, hardware, or a combination thereof) includes functionality to receive and process one or more inputs to generate a message digest.

In one or more embodiments of the invention, an n-bit generator includes functionality to receive and process one or more inputs to generate a message digest. A message digest is a string of characters, which may be represented as a bit-string, in accordance with one or more embodiments of the invention. In one or more embodiments of the invention, the message digest is a bit string. Further, the n-bit generator includes functionality to generate a deterministic and repeatable message digest, which appears pseudo-random or random, in accordance with one or more embodiments of the invention. A pseudo-random output (e.g., message digest) is output that is repeatable and predictable but appears random. Specifically, in one or more embodiments of the invention, although the message digest is repeatable and calculable when the inputs and the operations performed by the n-bit generator are known, the message digest appears random. The apparent randomness may be with respect to someone who knows or does not know the inputs in accordance with one or more embodiments of the invention. Alternatively, or additionally, the apparent randomness may be with respect to someone who does not know the operations performed by the n-bit generator in accordance with one or more embodiments of the invention. In one or more embodiments of the invention, the message digest is deterministic in that a single output exists for a given set of inputs. Moreover, the message digest may be a fixed length. In other words, regardless of the input length, the same n-bit generator may produce a message digest with a fixed length.

The number of bits in the input to the n-bit generator may be different or the same as the number of bits in the output produced by the n-bit generator. For example, if the n-bit generator accepts n number of bits for input and produces m number of bits for output, m may be less than, equal to, or greater than n. Multiple iterations of the n-bit generator may be performed to construct an ever-increasing m-bit result that includes multiple message digests.

Further, the n-bit generator includes functionality to generate a deterministic message digest. Specifically, the n-bit generator has the following two properties. First, the n-bit generator generates the same message digest when provided with the same input(s). Second, the n-bit generator generates, with a high probability, a different message digest when provided with different input(s). For example, a single bit change in the input may result in a significant change of the bits in the resulting message digest. In the example, the change may be fifty percent of the bits depending on the type of n-bit generator used. However, a greater percentage or less percentage of bits may change without departing from the scope of the invention.

The n-bit generator may include multiple sub-routines, such as a bit shuffler (not shown) and a hash function (not shown). In one or more embodiments of the invention, the bit shuffler includes functionality to combine multiple inputs into a single output. Specifically, the bit shuffler applies a function to the bit level representation of inputs to generate a resulting set of output bits. The output of the bit shuffler may appear as a shuffling of bits in each of inputs and may or may not have the same ratio of 1's to 0's as the input. In one or more embodiments of the invention, the bit shuffling by the bit shuffler has a commutative property. In other words, the order that inputs are provided to the bit shuffler does not affect the output. For example, consider the scenario in which the inputs are input X, input Y, and input Z. Bit shuffling on input X, input Y, and input Z produces the same output as bit shuffling on input Y, input Z, and input X.

In one embodiment of the invention, the bit shuffler may correspond to any function or series of functions for combining inputs. For example, the bit shuffler may correspond to the XOR function, the multiplication function, an addition function, or another function that may be used to combine inputs. As another example, the security application with the bit shuffler may correspond to a function that orders the inputs and then uses a non-commutative function to generate an output. The bit shuffler may correspond to other mechanisms for combining multiple inputs without departing from the scope of the invention.

In one or more embodiments of the invention, a hash function is a function that includes functionality to receive an input and produce a pseudo-random output. In one or more embodiments of the invention, the hash function may include functionality to convert a variable length input into a fixed length output. For example, the hash function may correspond to GOST, HAVAL, MD2, MD4, MD5, PANAMA, SNEERU, a member of the RIPEMD family of hash functions, a member of the SHA family of hash functions, Tiger, Whirlpool, S-Box, P-Box, any other hash function, or combination thereof.

Although the above description discusses the use of the bit shuffler prior to the hash function, in one or more embodiments of the invention, the hash function operations may be performed prior to the bit shuffler operations. For example, the hash function may be performed separately on each of the inputs to create hashed inputs. The hashed inputs may then be combined by the bit shuffler. Alternatively, the bit shuffler may be first performed on the inputs to create a single intermediate result before the intermediate result is provided to the hash function. The intermediate result may be stored to be used later to create subsequent message digests.

In one embodiment of the invention, a bit shuffler(s) or a hash function(s) may be used in place of the n-bit generator to generate the aforementioned message digest.

Continuing with the discussion of FIG. 6A, in Step 614, as shown in FIG. 6B, the originating system OTP (622), the answering system OTP (624), the secret session encryption key (626), and an increment value (628) are extracted from the message digest and stored in the token. In one embodiment of the invention, the originating system OTP (622), the answering system OTP (624), the secret session encryption key are stored (626), and the increment value (628) are stored, for example, with the host ID in the RAM of the token.

Continuing with the discussion of FIG. 6A, in Step 616, the host is notified that the token has completed the Begin Authentication command. In Step 618, the host is notified that the token is not activated. In Step 620, the host is notified that the host ID (i.e., its host ID) is not present in the token's access table.

Figure 7:
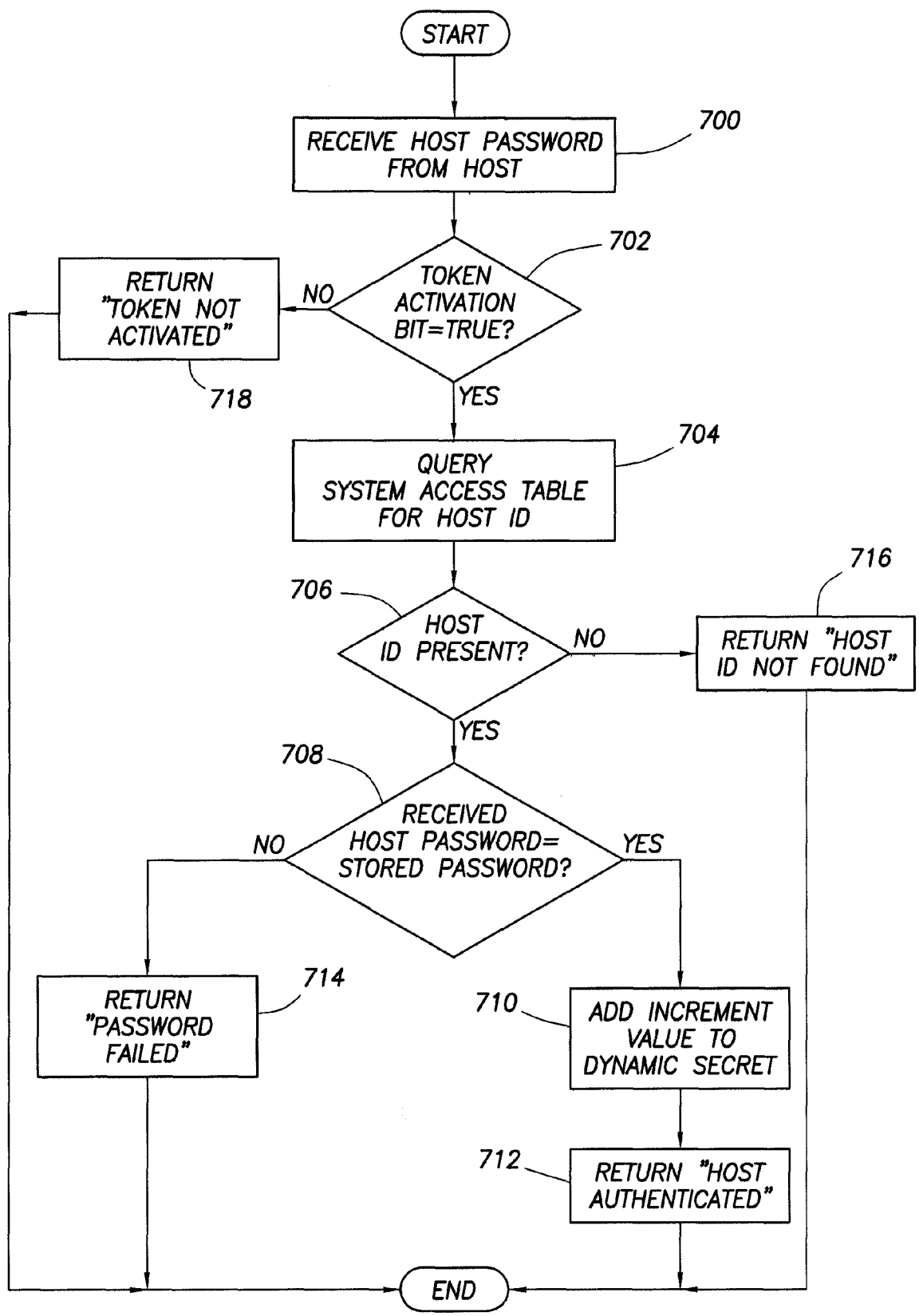

Referring to FIG. 7, FIG. 7 shows a method for authenticating a host to the token. In Step 700, the token receives a password from the host as part of the Authenticate Host command. In one embodiment of the invention, the host generates the password using a static secret obtained from the host, a dynamic secret from the host, and an instance of the n-bit generator, where the instance of the n-bit generator corresponds to the n-bit generator implemented by the token. In another embodiment, the host generates the password using the dynamic system ID and/or the dynamic token ID along with the static key, and the dynamic key as inputs into an instance of the n-bit generator.

In Step 702, a determination is made about whether the token is active. If the token is active, the process proceeds to Step 704; otherwise the process proceeds to Step 718.

In Step 704, the system access table is queried to determine whether the host ID is present. The host ID corresponds to the ID of the host that sent the Authenticate Host command to the token. In one embodiment of the invention, the system access table is located in the secure persistent storage and includes all host IDs from which the token is able to accept commands.

In Step 706, a determination is made about whether the host ID is present in the system access table. If the host ID is present in the system access table, the process proceeds to Step 708; otherwise the process proceeds to Step 716.

In Step 708, the password received in Step 700 is compared with the appropriate OTP in the token. Specifically, the appropriate OTP associated with the host ID is obtained from secure persistent storage for comparison with the received password. The appropriate OTP may either be the originating system one-time password or the answering system one-time password depending on the mode of the token. For example, if the token is set in answering mode, then the appropriate OTP is the originating system OTP. Similarly, if the token is set in originating mode, then the appropriate OTP is the answering system OTP. If the received password equals the appropriate OTP, then the process proceeds to Step 710; otherwise, the process proceeds to Step 714.

In Step 710, the increment value is added to the current dynamic secret (which is associated with the host ID) in the secure persistent storage. In the event that the increment value is zero then 1 (or another value) may be added to the dynamic secret prior to the addition of the increment value. Alternatively, 1 (or another value) is always added to the dynamic secret prior to the addition of the increment value. Regardless of the implementation, the updated dynamic secret is stored in the secure persistent storage, thereby replacing the current dynamic secret associated with the host ID.

In Step 712, the host is notified that it was successfully authenticated to by the token. In Step 714, the host is notified that it was unsuccessfully authenticated by the token. In Step 716, the host is notified that the host ID (i.e., its host ID) is not present in the token's access table. At this stage, the token may also take the appropriate steps to update the dynamic token ID and the dynamic system ID in the token's access table. In one embodiment of the invention, the dynamic token ID is updated by adding the increment value (and, optionally, 1) to the current dynamic token ID to obtain an updated dynamic token ID. In one embodiment of the invention, the dynamic system ID is updated by adding the increment value (and, optionally, 1) to the current dynamic system ID to obtain an updated dynamic system ID. In Step 718, the host is notified that the token is not activated.

In one embodiment of the invention, the host authenticates the token using the same process as shown in FIG. 7. However, the host compares the password provided by the token (either the originating OTP or the answering OTP depending on the mode of the token).

Figure 8:
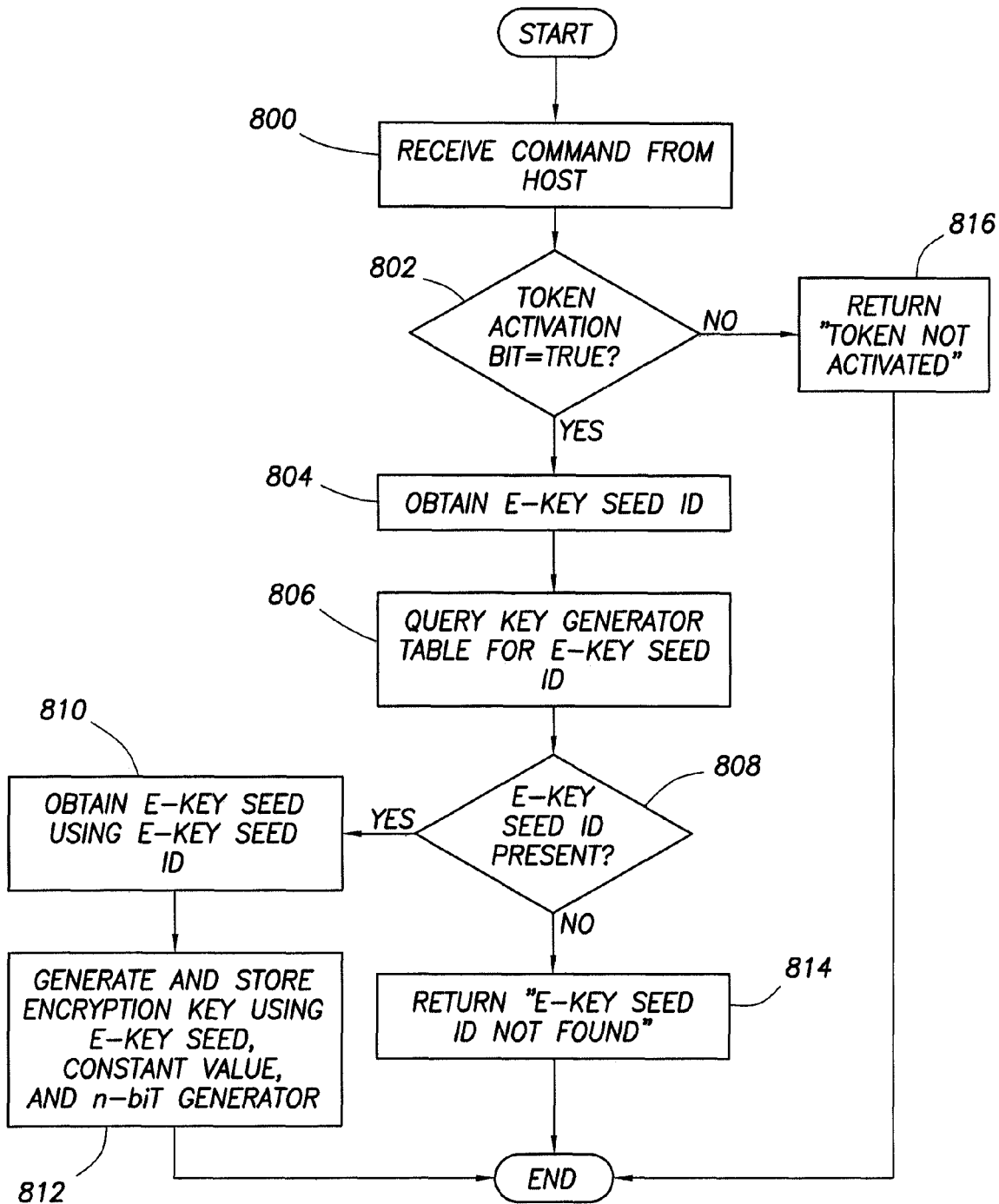

Referring to FIG. 8, FIG. 8 shows a method for generating an encryption key. In Step 800, the token receives a Generate Encryption Key command.

In Step 802, a determination is made about whether the token is active. If the token is active, the process proceeds to Step 804; otherwise the process proceeds to Step 816.

In Step 804, an E-key Seed ID is obtained (or determined). The E-key Seed ID may be obtained from the host at the same time as the command, based on a pre-agreed E-key Seed ID, or obtained (or determined) in some other manner. In Step 806, the E-key seed table (see FIG. 3C) is queried to determine the presence of the E-key Seed ID. In Step 808, a determination is made about whether the E-key Seed ID is present in the E-key seed table. If the E-key Seed ID is present in the E-key seed table, the process proceeds to Step 810; otherwise, the process proceeds to Step 814.

In Step 810, the E-key Seed ID is used to obtain the corresponding E-key Seed. In Step 812, an encryption key is generated using the E-key Seed, a constant value (defined below), and an n-bit generator. Specifically, a message digest is generated by the n-bit generator using the E-key Seed and the constant value as inputs. The resulting message digest (or a portion thereof) corresponds to the encryption key. The host is subsequently notified that the encryption key was generated. In Step 814, the host is notified that the E-key Seed ID identified in Step 804 is not present in the key generation table. In Step 816, the host is notified that the token is not active.

In one embodiment of the invention, the constant value is a string of bits, which may be provided to the token by a host (e.g., Host A in FIG. 1), provided by the administrator system associated with token, generated by the token. The constant value may change frequently (e.g., every time a new encryption key is generated), semi-frequently (e.g., each time the host is authenticated to the token), infrequently (e.g., periodically changed by the host and/or administrator system), or never (i.e., once the constant value is set, it never changes for the lifecycle of the token).

The encryption key generated in FIG. 8 may be provided to the host (e.g., Host A in FIG. 1) to encrypt information to be shared between the hosts (e.g., Host A and Host N in FIG. 1). The responding host system (e.g., Host N in FIG. 1) includes functionality to generate the same encryption key as the one generated in FIG. 8, or is connected to another token with the same functionality and information necessary to generate the encryption key. The generated encryption key may be used for symmetric encryption using a symmetric encryption algorithm. In another embodiment of the invention, the encryption key generated in FIG. 8 may be used to encrypt and/or decrypt files stored on the host (i.e., the host which was authenticated to the token in FIG. 7).

Figure 9:
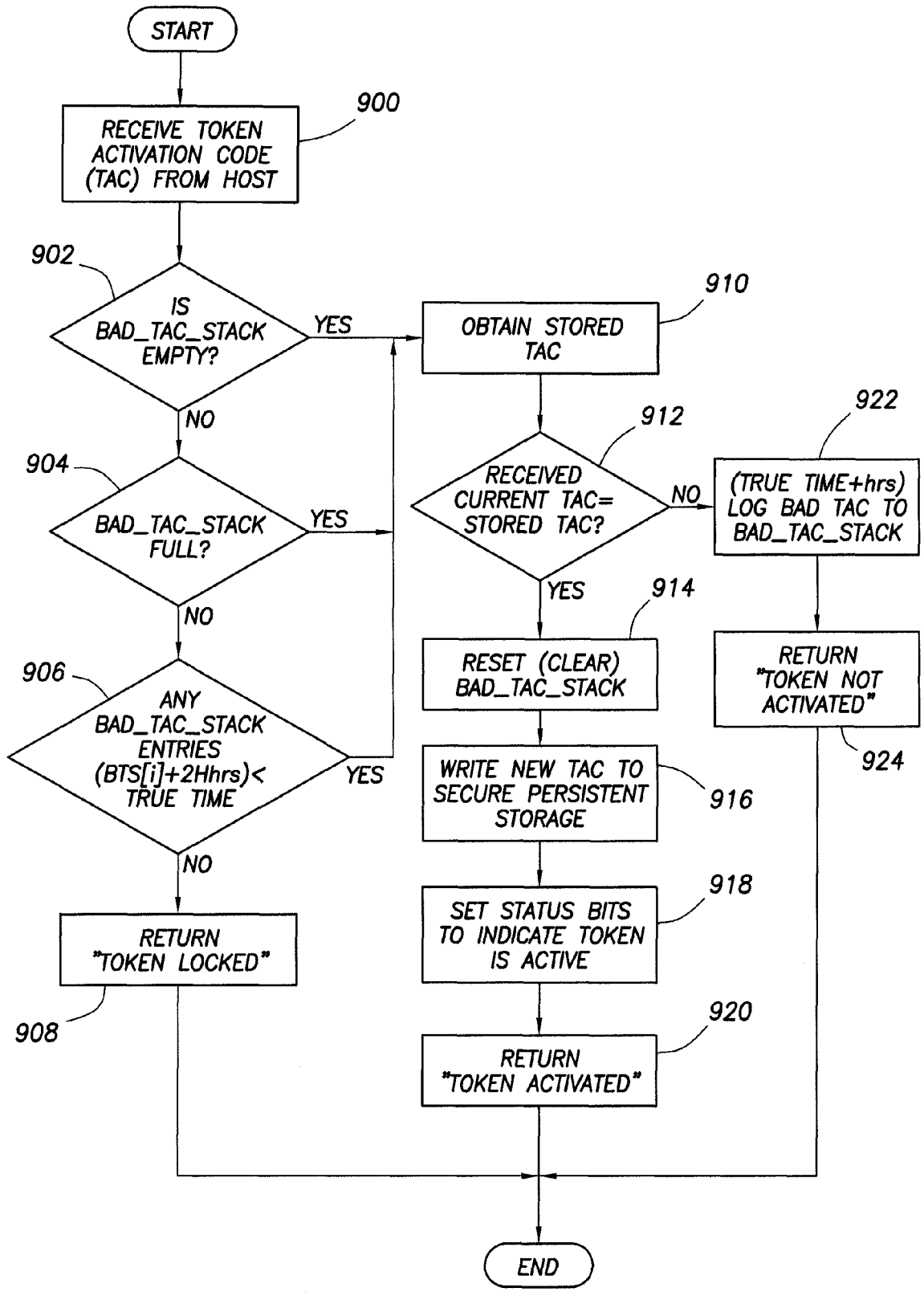

Referring to FIG. 9, FIG. 9 shows a method for performing the Change TAC command. In Step 900, a current TAC and a new TAC are received from the host. In Step 902, a determination is made about whether the BAD_TAC_Stack is empty. If the BAD_TAC_Stack is empty, the process proceeds to Step 910; otherwise the process proceeds to Step 904. In Step

904, a determination is made about whether the BAD_TAC_Stack is full (i.e., all entries in the BAD_TAC_Stack are currently being used to store information about unsuccessful TAC submissions). If the BAD_TAC_Stack is full, the process proceeds to Step 906; otherwise the process proceeds to Step 910.

In Step 906, a determination is made about whether any of the BAD_TAC_Stack entries have timed out. Specifically, do any of the entries in the BAD_TAC_Stack include a time stamp that is more than 24 hours old. Other time frames (i.e., time frames other than 24 hours) may be used without departing from the invention. If any of the BAD_TAC_Stack entries have timed out, the process proceeds to Step 910; otherwise the process proceeds to Step 908.

In Step 908, the token is locked and the host is notified accordingly. In one embodiment of the invention, once the token is locked, no commands may be performed on the token for a specified period of time and/or unless the administrator unlocks the token (using, for example, an unlock command issued in accordance with FIGS. 10-12 below).

In Step 910, the stored TAC is obtained from the secure persistent storage on the token. In Step 912, the received current TAC (i.e., the current TAC received in Step 900) is compared with the stored TAC (i.e., the TAC obtained in Step 910) to determine whether they match. If the received TAC matches the stored TAC, then the process proceeds to Step 914; otherwise the process proceeds to Step 922. In Step 914, the BAD_TAC_Stack entries are cleared. In Step 916, the stored TAC is overwritten by the new TAC (i.e., the new TAC received in Step 900) in the secure persistent storage.

In Step 918, the appropriate status bits in the token are set to indicate the token is active. In Step 920, the token notifies the host that the token is now active. In Step 922, a BAD_TAC_Stack entry is created that includes a timestamp obtained using the current time plus 24 hours (or another timeframe as discussed above with respect to Step 906). In Step 924, the host is notified that the token was not activated.

While FIG. 9 refers to a "Stack" the BAD_TAC_Stack may be implemented using other data structures and is not limited to a stack data structure.

In one embodiment of the invention, the contents of the secure persistent storage may need to be updated by an administrator. In such instances, the token requires a secure mechanism by which it can be updated. In particular, the token needs a mechanism to authenticate the administrator as well as a mechanism to securely transmit commands and content to the token over an unsecured communication channel. For example, the administrator may communicate with the token directly or indirectly over a wired or wireless network depending on the native functionality of the token. In particular, the token may rely on a host's wireless network interface in order to relay communications to and from the administrator. In such cases, the token does not want the host to be able to determine the contents being transmitted to the token and may also protect the commands being issued to the token by the administrator.

The following discussion details various embodiments of the invention to enable an administrator to interact with the token in the manner described above. In the following discussion, the term administrator refers to the administrative system under the control of an administrator (i.e., an individual or automated process).

Figure 10:
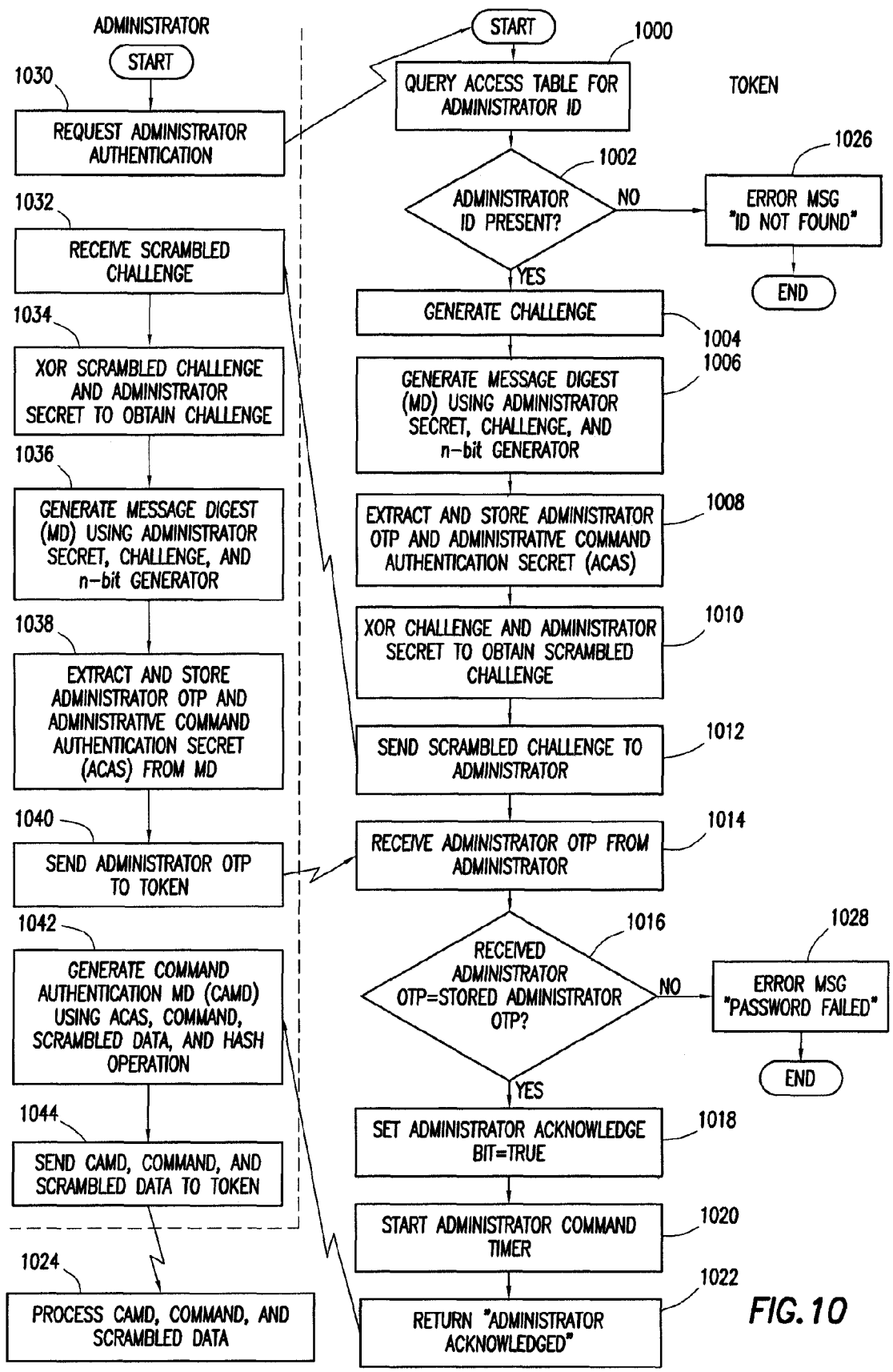

FIG. 10 shows a flowchart detailing the authentication of the administrator to the token in accordance with one or more embodiments of the invention. In Step 1030, the administrator sends an Administrator Authentication command to the token. In one embodiment of the invention, the Administrator Authentication command includes an administrator ID. In Step 1000, the token queries a data structure in the secure persistent storage (see e.g., FIG. 3D) to determine the presence of the administrator ID. In Step 1002, a determination is made about whether the administrator ID is present in the data structure. If the administrator ID is present, then the process proceeds to Step 1004; otherwise, the process proceeds to Step 1026.

In Step 1004, the token generates a challenge using, for example, a random (or pseudo) number generator. In one embodiment of the invention, the generated challenge is stored in the RAM of the token.

In Step 1006, a message digest is generated by an n-bit generator using the administrator secret obtained from the secure persistent storage (see FIG. 3D), and the challenge (generated in Step 1004) as inputs.

In Step 1008, the administrator OTP and the Administrative Command Authentication Secret (ACAS) are extracted from the message digest and stored in, for example, the RAM of the token. FIG. 11A shows an example of the message digest (1100) generated in Step 1006 that includes the administrator OTP (1102) and the ACAS (1104). Further, the length of the individual components in the message digest, as well as the order of the individual components within the message digest may vary based on the implementation.

Returning to FIG. 10, in Step 1010 the XOR function is applied to the challenge and the administrator secret to obtain a scrambled challenge. In one embodiment of the invention, Step 1010 is not performed and an unscrambled challenge is transmitted to the administrator in Step 1012. Otherwise, in Step 1012, the scrambled challenge is sent to the administrator. As discussed above, if the challenge is not scrambled in Step 1010, then the challenge and, not the scrambled challenge, is sent to the administrator. In one embodiment of the invention, Steps 1010 and 1012 may be performed prior to Step 1006. In such cases, the aforementioned order of the Steps may allow the n-bit generator on the token to perform various steps while awaiting a response from the administrator.

In Step 1032, the administrator receives the scrambled (or unscrambled challenge) from the token. In Step 1034, the administrator obtains the unscrambled challenge (if a scrambled challenge is sent from the token) by applying the XOR function to the scrambled challenge and the administrator secret. Step 1034 is only performed if a scrambled challenge (as opposed to an unscrambled challenge) is received. Otherwise, an unscrambled challenge is used in Step 1036. In one embodiment of the invention, the bit shuffler does not apply the same function to the inputs to the n-bit generator as the function used to generate the scrambled challenge from the administrator secret. For example, if the XOR function is used to generate the scrambled challenge then the XOR function is not used by the bit shuffler in the generation of the ACAS.

In Step 1036, the administrator generates a message digest using an instance of the same n-bit generator currently implemented by the token along with the administrator secret (currently stored with the administrator) and the challenge (obtained in Step 1030 (and, optionally, 1034)) as inputs.

In Step 1038, the administrator OTP and the ACAS are extracted from the message digest generated in Step 1036 and stored by the administrator. In Step 1040, the administrator sends the administrator OTP obtained in Step 1038 to the token. In Step 1014, the token receives the administrator OTP from the administrator. In Step 1016, the administrator OTP obtained in Step 1014 is compared with the administrator OTP obtained in Step 1008. If the administrator OTPs match, then the process proceeds to Step 1018; otherwise, the process proceeds to Step 1028. In Step 1028, the administrator is notified that the administrator OTPs did not match and, as such, the administrator has not been authenticated to the token.

In Step 1018, the status bits in the token are set to indicate that the administrator has been authenticated. In Step 1020, an administrator command timer is started. The administrator command timer prevents the status bits indicating that the administrator is authenticated to the token from being permanently set, and also prevents attacks via administrator commands by limiting response time from a would be attacker.

At this stage, after the administrator has been authenticated to the token, the administrator may send commands and content to the token. Specifically, in Step 1042, the administrator may generate a Command Authentication Message Digest (CAMD) using a hash operation along with the ACAS, a command (to be performed on the token), and the scrambled data as inputs.

Referring to FIG. 11B, the scrambled data (1108) is generated by combining unscrambled data (1106) with the ACAS (1104) using an XOR function (though other functions may be used). In one embodiment of the invention, the unscrambled data (1106) includes an identifier and a secret field (along with the associated length parameters). The identifier may identify the type of data in the secret field and the secret field includes the corresponding data. For example, the identifier may include "E-Key Seed" and the secret field may include the corresponding E-Key Seed value.

Figure 11C:
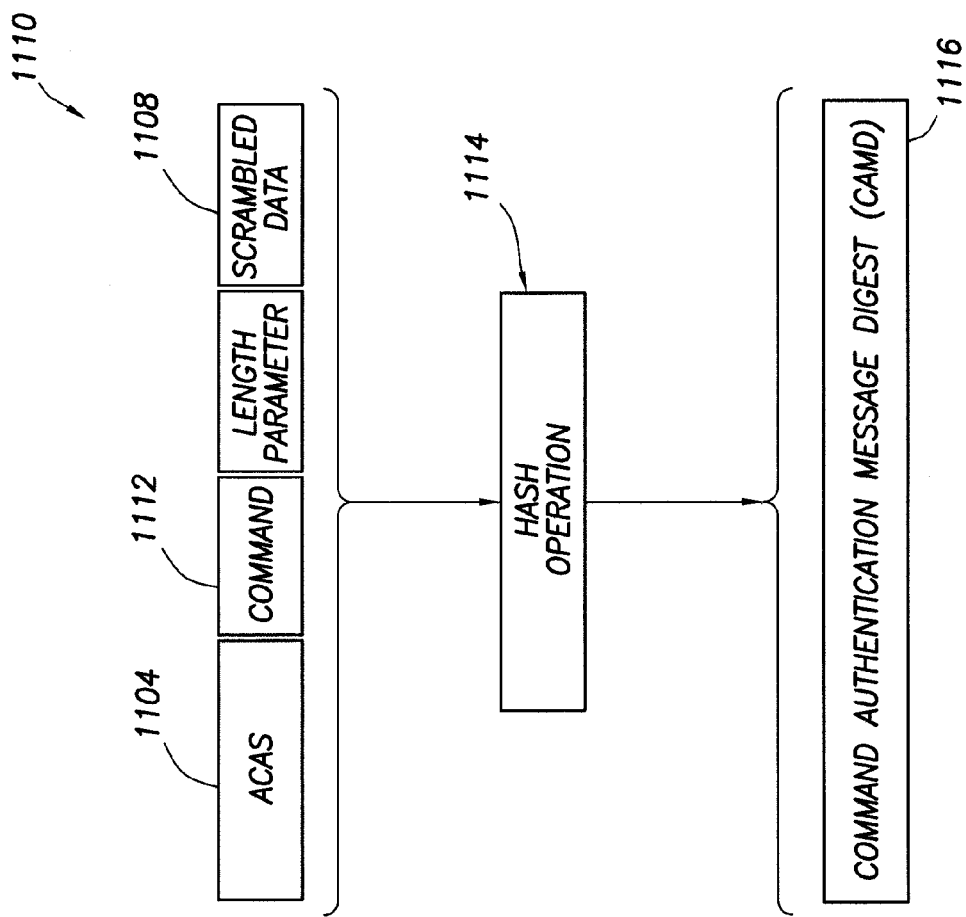

Referring to FIG. 11C, the CAMD (1116) is generated using the ACAS (1104), the command (1112), and the scrambled data (1108) along with a hash function (1114). The length parameter (LP in FIG. 11C) defines the length (in bits) of the scrambled data may or may not be used to generate the CAMD. The commands that may be requested by the administrator may include, but are not limited to, Request for Authentication (see FIG. 10), Verify Administrator Password (See FIG. 10), Authenticate Administrator Command (See FIG. 12), Create a Administration ID entry, Create a host ID entry, Delete a host ID entry, Create an E-Key seed ID entry, Delete an E-Key seed ID entry, Write static secret, Write dynamic secret, Write E-key seed, Write administrator secret, Write TAC (see FIG. 9), Read real time clock and offset value, and Reset administrator acknowledged bit.

Returning to FIG. 10, in Step 1044, the CAMD, the command, and the scrambled data are sent to the token. In one embodiment of the invention, the command may also be scrambled (using, for example, the XOR function and the ACAS) to generate a scrambled command. In Step 1024, the token receives the CAMD, the command (scrambled or unscrambled) and the scrambled data, and proceeds to process the received data as described in FIG. 12.

FIG. 12 shows a flowchart for processing a command received from the administrator in accordance with one or more embodiments of the invention. In Step 1200, the token receives a CAMD, command (scrambled or unscrambled), and scrambled data from the administrator. In Step 1202, a determination is made about whether the administrator has been authenticated to the token using, for example, the status bits in the token. If the administrator has been authenticated to the token, the process proceeds to Step 1204; otherwise, the process proceeds to Step 1218. In Step 1204, the ACAS (obtained in Step 1008 of FIG. 10), the command (in an unscrambled form), and the scrambled data are used as input into a hash operation to generate a CAMD. The hash operation corresponds to the same hash operation being implemented by the administrator in Step 1042 of FIG. 10. In Step 1206 of FIG. 12, the CAMD received in Step 1200 is compared with the CAMD generated in Step 1204.

In Step 1208, a determination is made about whether the CAMDs match. If the CAMDs match, the process proceeds to Step 1210; otherwise the process proceeds to Step 1220. In Step 1210, the unscrambled data is obtained from the scrambled data using the XOR function and the ACAS (obtained in Step 1008). In Step 1212, the command (received in Step 1200) is performed by the token using the unscrambled data obtained in Step 1210. In Step 1214, the administrator command timer is reset. In Step 1216, the administrator is notified that the command has been completed.

In Step 1218, the administrator is notified that it is not allowed to send commands to the token. In Step 1220, the administrator is notified that the CAMD it generated in Step 1042 does not match CAMD generated in Step 1204.

In one embodiment of the invention, the embodiments described in FIGS. 10-12 may be used by any entity (in addition to the administrator) to communicate commands to the token.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for performing a command on a token, comprising:
   receiving a first command authentication message digest (CAMD), a command, and scrambled data from a sender;
   making a first determination that the sender is allowed to send commands to the token;
   based on the first determination:
   generating a second CAMD on the token using the command, the scrambled data, and an Administrative Command Authentication Secret (ACAS), wherein the ACAS is obtained from a portion of a message digest, wherein the message digest is generated using a challenge, and an administrator secret, and an n-bit generator, and wherein the administrator secret is distinct from the ACAS;
   making a second determination that the first CAMD and the second CAMD match; and
   based on the second determination, performing the command by the token, wherein performing the command by the token comprises: obtaining an input for the command from the scrambled data using the ACAS.

2. The method of claim 1, wherein an XOR function is applied to the ACAS and the scrambled data to obtain the input.

3. The method of claim 2, wherein the input comprises a secret value.

4. The method of claim 1, wherein the ACAS is generated on the token.

5. The method of claim 1, wherein making the first determination comprises determining whether the sender provided the token a first one-time password (OTP) that matches a second OTP on the token.

6. The method of claim 5, wherein the second OTP is obtained from the message digest wherein the token generates the challenge.

7. The method of claim 6, wherein the challenge is sent to the sender as a scrambled challenge.

8. The method of claim 7, wherein the scrambled challenge is generated using the administrator secret.

9. The method of claim 1, wherein the sender is an administrator.

10. A token, comprising:
a processor; and
a non-transitory computer readable medium comprising computer readable program code embodied therein which, when executed by the processor, performs a method, the method comprising:
receiving a first command authentication message digest (CAMD), a command, and scrambled data from a sender;
making a first determination that the sender is allowed to send commands to the token;
based on the first determination:
generating a second CAMD on the token using the command, the scrambled data, and an Administrative Command Authentication Secret (ACAS), wherein the ACAS is obtained from a portion of a message digest, wherein the message digest is generated using a challenge, and an administrator secret, and an n-bit generator, and wherein the administrator secret is distinct from the ACAS;
making a second determination that the first CAMD and the second CAMD match; and
based on the second determination, performing the command by the token, wherein performing the command by the token comprises: obtaining an input for the command from the scrambled data using the ACAS.

11. The token of claim 10, further comprising:
secure persistent storage configured to store the administrator secret;
a tamper detection module configured to determine whether the token has been tampered with and erase the secure persistent storage when tampering is detected.

12. The token of claim 10, wherein an XOR function is applied to the ACAS and the scrambled data to obtain the input.

13. The token of claim 12, wherein the input comprises a secret value.

14. The token of claim 10, wherein making the first determination comprises determining whether the sender provided the token a first one-time password (OTP) that matches a second OTP on the token.

15. The token of claim 14, wherein the second OTP is obtained from the message digest, wherein the token generates the challenge.

16. The token of claim 15, wherein the challenge is sent to the sender as a scrambled challenge.

17. The token of claim 16, wherein the scrambled challenge is generated using the administrator secret.

18. The token of claim 10, wherein the sender is an administrator.

19. The token of claim 10, wherein the token is one selected from a group consisting of a mobile phone, a smart phone, a personal digital assistant, and a gaming device.

20. A token, comprising:
integrated circuits configured to perform a method, the method comprising:
receiving a first command authentication message digest (CAMD), a command, and scrambled data from a sender;
making a first determination that the sender is allowed to send commands to the token;
based on the first determination:
generating a second CAMD on the token using the command, the scrambled data, and an Administrative Command Authentication Secret (ACAS), wherein the ACAS is obtained from a portion of a message digest, wherein the message digest is generated using a challenge, and an administrator secret, and an n-bit generator, and wherein the administrator secret is distinct from the ACAS;
making a second determination that the first CAMD and the second CAMD match; and
based on the second determination, performing the command by the token, wherein performing the command by the token comprises: obtaining an input for the command from the scrambled data using the ACAS.

21. The token of claim 20, wherein an XOR function is applied to the ACAS and the scrambled data to obtain the input.

22. The token of claim 21, wherein the input comprises a secret value.

23. The token of claim 20, wherein making the first determination comprises determining whether the sender provided the token a first one-time password (OTP) that matches a second OTP on the token.

24. The token of claim 23, wherein the second OTP is obtained from the message digest.

25. The token of claim 24, wherein the challenge is sent to the sender as a scrambled challenge.

26. The token of claim 25, wherein the scrambled challenge is generated using the administrator secret.

27. The token of claim 20, wherein the token complies with at least one selected from a group consisting of ISO/IEC 7810, ISO/IEC 7813, ISO/IEC 7811, and ISO/IEC 7816.

28. A non-transitory computer readable medium comprising computer readable program code embodied therein for causing a token to perform a method, the method comprising:
receiving a first command authentication message digest (CAMD), a command, and scrambled data from a sender;
making a first determination that the sender is allowed to send commands to the token;
based on the first determination:
generating a second CAMD on the token using the command, the scrambled data, and an Administrative Command Authentication Secret (ACAS), wherein the ACAS is obtained from a portion of a message digest, wherein the message digest is generated using a challenge, and an administrator secret, and an n-bit generator, and wherein the administrator secret is distinct from the ACAS;
making a second determination that the first CAMD and the second CAMD match; and
based on the second determination, performing the command by the token, wherein performing the command by the token comprises: obtaining an input for the command from the scrambled data using the ACAS.

29. The non-transitory computer readable medium of claim 28, wherein an XOR function is applied to the ACAS and the scrambled data to obtain the input.

30. The non-transitory computer readable medium of claim 29, wherein the input comprises a secret value.

31. The non-transitory computer readable medium of claim 28, wherein making the first determination comprises determining whether the sender provided the token a first one-time password (OTP) that matches a second OTP on the token.

32. The non-transitory computer readable medium of claim 31, wherein the second OTP is obtained from the message digest, wherein the token generates the challenge.

33. The non-transitory computer readable medium of claim 32, wherein the challenge is sent to the sender as a scrambled challenge.

34. The non-transitory computer readable medium of claim 33, wherein the scrambled challenge is generated using the administrator secret.

35. The non-transitory computer readable medium of claim 28, wherein the sender is an administrator.

* * * * *